(12) United States Patent
Bai et al.

(10) Patent No.: US 11,585,404 B1
(45) Date of Patent: Feb. 21, 2023

(54) VIBRATION DAMPING ACTUATOR

(71) Applicant: Hefei University of Technology, Hefei (CN)

(72) Inventors: Xianxu Bai, Hefei (CN); Zhuangzhuang Lv, Hefei (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 17/671,958

(22) Filed: Feb. 15, 2022

(30) Foreign Application Priority Data

Oct. 22, 2021 (CN) .......................... 202111232962.6

(51) Int. Cl.
*F16F 9/53* (2006.01)
*F16F 15/00* (2006.01)
*F16F 15/04* (2006.01)

(52) U.S. Cl.
CPC ............ *F16F 15/002* (2013.01); *F16F 15/04* (2013.01); *F16F 2228/063* (2013.01)

(58) Field of Classification Search
CPC ...... F16F 15/002; F16F 15/0275; F16F 15/03; F16F 9/535; F16F 2228/063
USPC ...................................................... 188/267.2
See application file for complete search history.

(56) References Cited

U.S. PATENT DOCUMENTS

| | | | | |
|---|---|---|---|---|
| 5,780,943 A | * | 7/1998 | Ono ................... | G03F 7/70691 310/90.5 |
| 6,040,675 A | * | 3/2000 | Ono ................... | G03F 7/70691 108/146 |
| 6,129,185 A | * | 10/2000 | Osterberg ............... | F16F 9/103 188/267.2 |
| 6,953,108 B2 | * | 10/2005 | Anderfaas ............... | F16F 9/535 188/267.2 |
| 7,445,094 B1 | * | 11/2008 | Henderson .............. | F16F 9/535 188/267.2 |
| 7,628,254 B1 | * | 12/2009 | Henderson .............. | F16F 9/535 188/267.2 |
| 9,829,059 B2 | * | 11/2017 | Chen ....................... | F16F 6/005 |

(Continued)

FOREIGN PATENT DOCUMENTS

| | | |
|---|---|---|
| CN | 103775550 A | 5/2014 |
| CN | 104309438 A | 1/2015 |

(Continued)

*Primary Examiner* — Thomas W Irvin
(74) *Attorney, Agent, or Firm* — Fideli Law PLLC

(57) ABSTRACT

A vibration damping actuator provided by the present disclosure uses a magnet system or a spring system to introduce controllable negative stiffness characteristics into a semi-active system, so as to couple a controllable negative stiffness actuator on the basis of the semi-active actuator (controllable damping actuator). Based on the coupling and integration of the semi-active actuator (controllable damping actuator) and the controllable negative stiffness actuator, the vibration damping actuator may realize four-quadrant mechanical characteristics of an active actuator, improve the vibration damping effect of the semi-active system on the basis of ensuring the advantages of low power consumption, low cost, stability and reliability, and simple structure of the vibration control system of the semi-active actuator (controllable damping actuator), and improve the vibration isolation effect of the semi-active system to a level close to that of an active system.

18 Claims, 12 Drawing Sheets

(56) References Cited

U.S. PATENT DOCUMENTS

2008/0053763 A1\* 3/2008 Wereley ................. F16F 7/1011
188/267.2
2017/0045107 A1\* 2/2017 Chen ....................... F16F 6/005
2021/0094799 A1\* 4/2021 Saito ..................... F16F 15/035

FOREIGN PATENT DOCUMENTS

| CN | 105402297 | A |   | 3/2016  |             |
|----|-----------|---|---|---------|-------------|
| CN | 110805645 | A |   | 2/2020  |             |
| CN | 111042370 | A |   | 4/2020  |             |
| CN | 111336210 | A |   | 6/2020  |             |
| CN | 111810585 | A | \* | 10/2020 | ........... F16F 15/022 |
| CN | 111828524 | A |   | 10/2020 |             |
| CN | 112413044 | A |   | 2/2021  |             |

\* cited by examiner

VIBRATION DAMPING ACTUATOR

RELATED APPLICATIONS

This application claims the benefit of priority to Chinese application No. 202111232962.6, filed on Oct. 22, 2021, and entitled "VIBRATION DAMPING ACTUATOR", and the content of which is incorporated herein by reference in its entirety.

TECHNICAL FIELD

The present disclosure relates to the field of vibration control and isolation, and in particular, to a vibration damping actuator.

BACKGROUND

Long-term exposure to a vibration environment adversely affects human body or objects. Especially during vehicle driving, excessive vibration amplitude and vibration acceleration may not only affect the physical health of passengers in the vehicle, but also destroy building or bridge structure, reducing the vehicle's safety and service life. Thus, it is very important to reduce the impact of vibration. In existing technologies, a vibration damping system is usually used to reduce and isolate vibration. The commonly used vibration damping systems are divided into passive systems, semi-active systems, and active systems. The passive system is structurally simple and low in cost, but system parameters may not be adjusted, the vibration damping effect is poor, and the passive system is effective only in specific situations, so the usage scenario is limited. The active system may generate acting forces with adjustable magnitude and direction, and may realize mechanical control in four quadrants in the force-actuation velocity diagram, and the vibration damping performance is good. However, the active system is difficult to promote due to high power consumption, complex structure, and high cost. The semi-active system is a middle ground between the passive system and the active system, the semi-active system has the advantages of adjustable parameters and good vibration damping performance compared with the passive system, and has the advantages of simpler structure, higher reliability, lower power consumption, and lower cost compared with the active system, thus the semi-active systems has wide application potentials.

However, in the existing technologies, the semi-active system uses a damping adjustable vibration damper as a semi-active actuator, which may only adjust the magnitude of the damping force, and may not adjust the direction of the damping force. Thus, the semi-active system may only provide a limited range of controllable mechanical performance in the first and third quadrants of the force-actuation velocity diagram, and may not realize the opposing force of the second and fourth quadrants, so that the semi-active system may not realize the optimal performance in the full-frequency domain, and the vibration damping performance is not as good as the active system.

Therefore, it is necessary to provide a new vibration damping actuator with simple structure, low power consumption and high vibration damping performance, which has both the advantages of high reliability, simple structure, and low power consumption of a semi-active actuator, and the advantages of high vibration damping performance of an active actuator.

BRIEF SUMMARY

The present disclosure provides a vibration damping actuator with simple structure, low power consumption and high vibration damping performance.

The present disclosure provides a vibration damping actuator, including: a controllable damping actuator adjusting damping based on a control signal of a control system during operation; and a controllable negative stiffness actuator, connected to the controllable damping actuator, and adjusting negative stiffness at least based on the control signal during operation.

The vibration damping actuator may achieve the following beneficial effects:

1. A vibration damping actuator provided in some exemplary embodiments of the present disclosure includes a controllable negative stiffness actuator, which may be formed through the combination of a set of magnetic devices arranged in the same pole or springs, so as to introduce negative stiffness characteristics related to stroke, and the controllable negative stiffness actuator may combine the negative stiffness characteristics with the semi-active system such as the magnetorheological vibration damper. The combined vibration damping actuator may generate a driving force by itself, so that the vibration damping performance of the combined vibration damping actuator may be higher than that of the semi-active system.

2. In the controllable negative stiffness actuator of the vibration damping actuator provided in some exemplary embodiments the present disclosure, by changing the magnitude of the current in the electromagnet or changing the spring stiffness in the spring system, the magnitude of the negative stiffness may be controlled, which may further improve the controllability of the vibration damping actuator and improve the vibration control effect. In addition, the combination of controllable negative stiffness actuator with different structures and the semi-active system may constitute a variety of structural forms of the vibration damping actuator, expanding the applications of the vibration damping actuator.

3. The vibration damping effect of the vibration damping actuator provided in some exemplary embodiments of the present disclosure may be closer to that of the active system, while the power consumption and cost may be lower than that of the active system, and the operation may be more stable and reliable. In addition, compared with the general semi-active system, the vibration isolation effect of the vibration damping actuator may be greatly improved, so that the vibration damping actuator may be applied to more scenarios, including vibration isolation of some objects relatively sensitive to vibration.

4. The negative stiffness characteristics introduced in the vibration damping actuator provided in some exemplary embodiments the present disclosure may adjust the overall stiffness of a vibration isolation system, thereby expanding the effective frequency range of vibration damping.

5. The vibration damping actuator provided in some exemplary embodiments of the present disclosure is compact in structure, easy to install, and convenient to apply and promote. It may be improved on the basis of the existing semi-active system (the magnetorheological vibration damper, the controllable electronically controlled valve vibration damper, etc.) of the vehicle, so as to improve the vibration damping performance of the vehicle suspension system.

Other functions of the vibration damping actuator provided in some exemplary embodiments the present disclosure will be partially listed in the following description. From the description, the content introduced by the following numbers and examples will be apparent to those of ordinary skill in the art. The inventive aspects of the vibration damping actuator provided by the present disclosure may be explained by practice or by using the methods, devices or combinations described in the detailed examples below.

BRIEF DESCRIPTION OF THE DRAWINGS

In order to clearly describe the technical solutions in the exemplary embodiments of the present disclosure, the accompanying drawings required to describe the embodiments are briefly described below. Evidently, the accompanying drawings described below are only some exemplary embodiments of the present disclosure. Those of ordinary skill in the art may further obtain other accompanying drawings based on these accompanying drawings without inventive effort.

DETAILED DESCRIPTION

Figure 1:
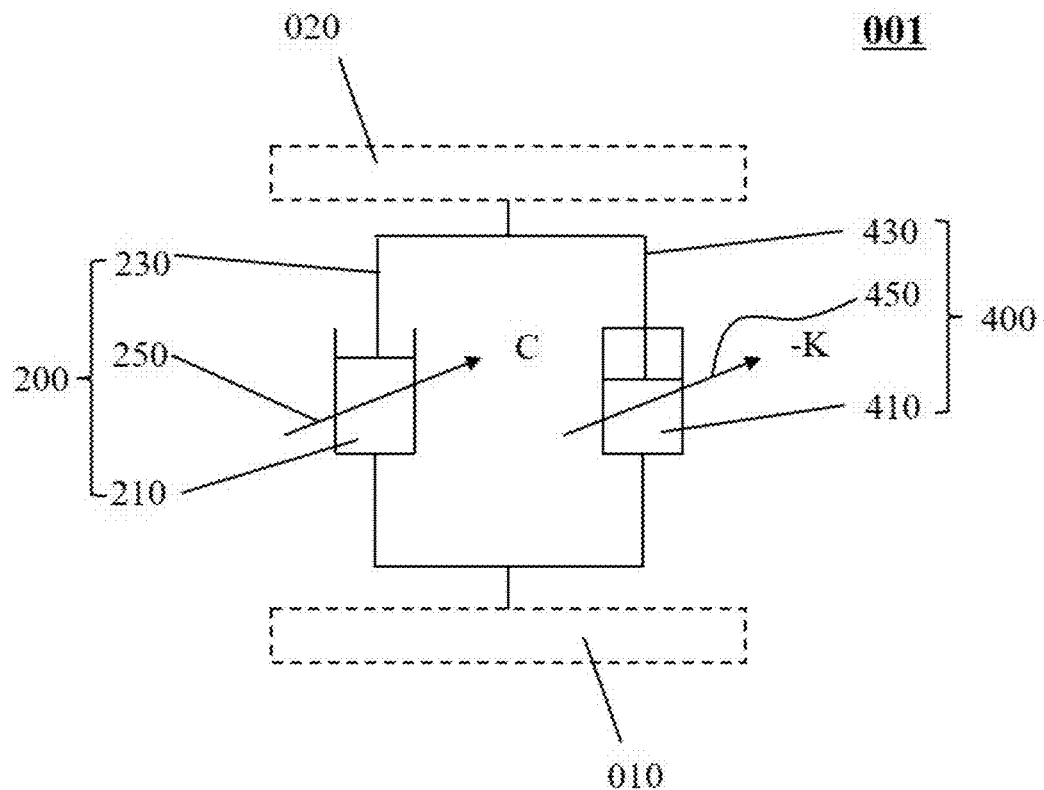
FIG. 1 is a schematic diagram of a working principle of a vibration damping actuator provided according to some exemplary embodiments of the present disclosure.

The following description provides specific application scenarios and requirements of the present disclosure, with the purpose of enabling those skilled in the art to make and use the content in the present disclosure. For those skilled in the art, various partial modifications to the disclosed exemplary embodiments are obvious, and without departing from the spirit and scope of the present disclosure, the general principles defined herein may be applied to other embodiments and application. Therefore, the present disclosure is not limited to the exemplary embodiments shown, but the widest scope consistent with the claims.

The terms used herein are merely intended to describe specific examples or exemplary embodiments, rather than to be limiting. For example, unless expressly stated otherwise in the context, the singular forms "a", "an" and "the" used herein may also include plural forms. When used in the present disclosure, the terms "include", "comprise" and/or "contain" refer to the existence of an associated integer, step, operation, element, and/or component, without excluding the existence of one or more other features, integers, steps, operations, elements, components and/or groups. In other words, other features, integers, steps, operations, elements, components and/or groups may be added to the system/method.

In consideration of the following description, in the present disclosure, these and other features, the operation and function of related elements of the structure, as well as the economics of the combination and manufacturing of components may be significantly improved. With reference to the drawings, all of these form part of the present disclosure. However, it should be clearly understood that the drawings are merely intended for illustration and description purposes, rather than to limit the scope of the present disclosure. It should also be understood that the accompanying drawings are not drawn to scale.

The vibration damping actuator provided in some exemplary embodiments of the present disclosure introduces controllable negative stiffness characteristics on the basis of a semi-active system and combines a controllable damping actuator and a controllable negative stiffness actuator, so as to realize four-quadrant mechanical characteristics of an active actuator. The vibration damping actuator provided in some exemplary embodiments of the present disclosure improves the vibration damping effect of the semi-active system on the basis of ensuring the advantages of low power consumption, low cost, stability and reliability, and simple structure of a vibration control system of a semi-active actuator (controllable damping actuator), and improves the vibration isolation effect of the semi-active system to a level close to that of an active system. In other words, the vibration damping actuator provided by the present disclosure is a semi-active actuator which may achieve the vibration damping effect of the active system. For the convenience of description, the semi-active actuator provided in some exemplary embodiments of the present disclosure which may achieve the vibration damping effect of the active system may be defined as a pseudo active actuator.

For the convenience of description, the terms that will appear in the following description will be first explained as follows:

Negative stiffness means that when an object is deformed by an external force, the object generates a force in the same direction as the deformation. The negative stiffness is opposite to positive stiffness.

FIG. 1 is a schematic diagram of a working principle of a vibration damping actuator 001 provided according to some exemplary embodiments of the present disclosure. The vibration damping actuator 001 may be applied to any vibration damping scenario, not only in the vehicle suspension system, but also in the vibration, protection and utilization systems of buildings, bridges and precision measurement. As shown in FIG. 1, both ends of the vibration damping actuator 001 may be connected to a first object 010 and a second object 020 during operation respectively. The first object 010 and the second object 020 may be two free objects which may move relative to each other in a vibration direction. The vibration damping actuator 001 may be used for vibration damping and vibration isolation between the first object 010 and the second object 020. The first object 010 and the second object 020 may be any vibrating objects of any scenario. For example, in a vehicle, the first object 010 may be a vehicle chassis, and the second object 020 may be a vehicle body. For another example, in a bridge system, the first object 010 may be a beam structure, and the second object 020 may be a column structure, and so on. The vibration direction may be the relative movement direction of the first object 010 and the second object 020 when vibrations occur. For example, in the vehicle, the vibration direction of the vehicle chassis and vehicle body may be a vertical direction. In some exemplary embodiments, the vibration direction may also be a horizontal direction, an oblique direction, etc. The present disclosure does not limit the vibration direction, and the vibration direction may be any direction.

As shown in FIG. 1, the vibration damping actuator 001 may include a controllable damping actuator 200 and a controllable negative stiffness actuator 400. In FIG. 1, C may represent damping, and −K may represent negative stiffness. The stiffness may refer to the ability of a structure to resist deformation. Both ends of the controllable damping actuator 200 may be directly or indirectly connected to the first object 010 and the second object 020 to provide a controllable damping force between the first object 010 and the second object 020. When the first object 010 and the second object 020 vibrate relative to each other, the direction of the damping force of the controllable damping actuator 200 on the first object 010 may be opposite to the movement direction of the first object 010 vibrating relative to the second object 020 (that is, the velocity direction of the first object 010 relative to the second object 020). The direction of the damping force of the controllable damping actuator 200 on the second object 020 may be opposite to the movement direction of the second object 020 vibrating relative to the first object 010 (that is, the velocity direction of the second object 020 relative to the first object 010). The controllable damping actuator 200 may be electrically connected to a control system (not shown in FIG. 1) during operation, so as to adjust the damping based on a control signal of the control system, thereby controlling the magnitude of the damping force.

Both ends of the controllable negative stiffness actuator 400 may be directly or indirectly connected to the first object 010 and the second object 020 to provide a controllable additional force between the first object 010 and the second object 020. When the first object 010 and the second object 020 vibrate relative to each other, the controllable negative stiffness actuator 400 may generate negative stiffness characteristics. The direction of the additional force of the controllable negative stiffness actuator 400 on the first object 010 may be the same as the movement direction of the first object 010 vibrating relative to the second object 020. The direction of the additional force of the controllable negative stiffness actuator 400 on the second object 020 may be the same as the movement direction of the second object 020 vibrating relative to the first object 010. The additional force and the damping force may be in opposite direction. The controllable negative stiffness actuator 400 may be electrically connected to the control system during operation, so as to adjust the negative stiffness based on the control signal of the control system, thereby controlling the magnitude of the additional force.

When the first object 010 vibrates relative to the second object 020 in the vibration direction, the vibration damping actuator 001 may adjust the magnitude of the damping and the negative stiffness based on the control signal, so as to control the magnitude of the damping force and the additional force, so that the direction of a resultant force of the damping force and the additional force may be the same as or opposite to the vibration direction, and the vibration damping actuator 001 may realize mechanical control characteristics in four quadrants of the force-actuation velocity diagram, improve the vibration damping effect of the semi-active system on the basis of ensuring the advantages of low power consumption, low cost, stability and reliability, and simple structure of the vibration control system of the controllable damping actuator 200 (semi-active actuator), and improve the vibration isolation effect of the semi-active system to a level close to that of an active system.

Figure 2:
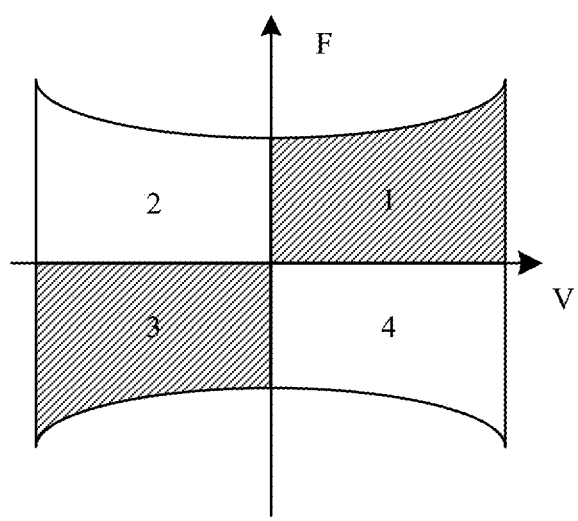
FIG. 2 is a schematic force-actuation velocity diagram provided according to some exemplary embodiments of the present disclosure.

FIG. 2 is a schematic force-actuation velocity diagram provided according to some exemplary embodiments of the present disclosure. The horizontal axis of the force-actuation velocity diagram may be an actuation velocity V which the vibration damping actuator 001 is subjected to, and the vertical axis may be the output force F of the vibration damping actuator 001. The output force F of the vibration damping actuator 001 is the resultant force of the damping force and the additional force. When the direction of the actuation velocity V is a positive direction, the actuation velocity V is a positive value. When the direction of the actuation velocity V is a negative direction, the actuation velocity V is a negative value. When the direction of the output force F is the same as the direction of the actuation velocity V, the output force F is a positive value. When the direction of the output force F is opposite to the direction of the actuation velocity V, the output force F is a negative value. The mechanical control in the four quadrants of the force-actuation velocity diagram may be: when the vibration damping actuator 001 is subjected to the actuation velocity V in a positive or negative direction, the direction of the output force F may be the same as the direction of the actuation velocity V to realize the mechanical control of the first quadrant 1 and the third quadrant 3 in the force-actuation velocity diagram; and when the vibration damping actuator 001 is subjected to the actuation velocity V in the positive or negative direction, the direction of the output force F may be opposite to the direction of the actuation velocity V to realize the mechanical control of the second quadrant 2 and the fourth quadrant 4 in the force-actuation velocity diagram. For example, when the vibration damping actuator 001 is subjected to the actuation velocity V in the positive direction, the control system adjusts the magnitude of the damping force and the additional force, so that when the damping force is greater than the additional force, the output force F is also in the positive direction, thereby mechanically controlling the first quadrant 1 in the force-actuation velocity diagram. For another example, when the vibration damping actuator 001 is subjected to the actuation velocity V in the positive direction, the control system may adjust the magnitude of the damping force and the additional force, so that when the damping force is smaller than the additional force, the output force F is in the negative direction, thereby mechanically controlling the fourth quadrant 4 in the force-actuation velocity diagram. For another example, when the vibration damping actuator 001 is subjected to the actuation velocity V in the negative direction, the control system may adjust the magnitude of the damping force and the additional force, so that when the damping force is greater than the additional force, the output force F is also in the negative direction, thereby mechanically controlling the third quadrant 3 in the force-actuation velocity diagram. For another example, when the vibration damping actuator 001 is subjected to the actuation velocity V in the negative direction, the control system may adjust the magnitude of the damping force and the additional force, so that when the damping force is smaller than the additional force, the output force F is in the positive direction, thereby mechanically controlling the second quadrant 2 in the force-actuation velocity diagram.

The controllable damping actuator 200 may be at least one of: an electric/magnetorheological vibration damper, an electronically controlled valve vibration damper, an energy regenerative vibration damper, an air spring, or a semi-active inerter. An inerter may be a mechanical two-node (two-terminal), one-port device with a property that an equal and opposite force applied at the nodes is proportional to the relative acceleration between the nodes. As shown in FIG. 1, the controllable damping actuator 200 may include a second cylinder 210, a second piston 230 and a controllable damping component 250.

The second cylinder 210 may accommodate damping fluid. The damping fluid may provide the damping force. Different types of the controllable damping actuator 200 may accommodate different types of the damping fluid. The damping fluid will be described in detail in the following description.

The second piston 230 may be located in the second cylinder 210, and slidably connected to the second cylinder 210 in the vibration direction. The second cylinder 210 and the second piston 230 may move relative to each other in the vibration direction. The second cylinder 210 and the second piston 230 may be directly or indirectly connected to the first object 010 and the second object 020.

The controllable damping component 250 may be connected to at least one of the second cylinder 210 or the second piston 230. In some exemplary embodiments, the controllable damping component 250 may be installed on the second cylinder 210. In some exemplary embodiments, the controllable damping component 250 may also be installed on the second piston 230. The controllable damping component 250 may be electrically connected to the control system during operation, and adjust the damping based on the control signal. When the second piston 230 and the second cylinder 210 vibrate relative to each other, the controllable damping component 250 may apply a controllable damping force where the direction of the controllable damping force is opposite to vibration directions of the second cylinder and the second piston to the second cylinder 210 and the second piston 230. Specifically, when the second piston 230 and the second cylinder 210 vibrate relative to each other, the controllable damping component 250 may apply a controllable damping force to the second piston 230 where the direction of the controllable damping force is opposite to the vibration direction of the second piston 230 relative to the second cylinder 210. Conversely, the controllable damping component 250 may apply a controllable damping force to the second cylinder 210 where the direction of the controllable damping force is opposite to the vibration direction of the second cylinder 210 relative to the second piston 230.

As shown in FIG. 1, the controllable negative stiffness actuator 400 may include a first cylinder 410, a first piston rod 430 and a controllable negative stiffness component 450.

The first piston rod 430 may be slidably connected to the first cylinder 410 in the vibration direction. The first cylinder 410 and the first piston rod 430 may move relative to each other in the vibration direction. The first cylinder 410 and the first piston rod 430 may be directly or indirectly connected to the first object 010 and the second object 020.

The controllable negative stiffness component 450 may be connected to the first cylinder 410 and the first piston rod 430. The controllable negative stiffness component 450 may be electrically connected to the control system during operation, and may at least generate the negative stiffness characteristics based on the control signal, and may adjust the negative stiffness based on the control signal. When the first piston rod 430 and the first cylinder 410 vibrate relative to each other, the controllable negative stiffness component 450 may apply a controllable additional force where the direction of the controllable additional force is the same as vibration directions of the first piston rod and the first cylinder to the first piston rod 430 and the first cylinder 410. Specifically, when the first piston rod 430 and the first cylinder 410 vibrate relative to each other, the controllable negative stiffness component 450 may apply a controllable additional force to the first piston rod 430 where the direction of the controllable additional force is the same as the vibration direction of the first piston rod 430 relative to the first cylinder 410. Conversely, the controllable negative stiffness component 450 may apply a controllable additional force to the first cylinder 410 where the direction of the controllable additional force is the same as the vibration direction of the first cylinder 410 relative to the first piston rod 430.

The controllable damping actuator 200 may be connected to the controllable negative stiffness actuator 400. The connection may be a direct connection or an indirect connection. The indirect connection may be indirect connection between the controllable damping actuator 200 and the controllable negative stiffness actuator 400 through other equipment, such as the first object 010 or the second object 020. The first cylinder 410 and the first piston rod 430 may be connected to the second cylinder 210 and the second piston 230 respectively. In some exemplary embodiments, the first cylinder 410 may be connected to the second cylinder 210, and the first piston rod 430 may be connected to the second piston 230. In some exemplary embodiments, the first cylinder 410 may be connected to the second piston 230, and the first piston rod 430 may be connected to the second cylinder 210. For the convenience of presentation, the conditions that the first cylinder 410 is connected with the second cylinder 210, and the first piston rod 430 is connected with the second piston 230 will be taken as examples below for description. When the first cylinder 410 is connected to the second cylinder 210, the first cylinder 410 and the second cylinder 210 may be integrally formed, or may be two fixedly connected separate structures. The fixed connection may include at least one of: a threaded connection, a welded connection, a riveted connection, a bonded connection, or a snapped connection. When the first piston rod 430 is connected to the second piston 230, the first piston rod 430 and the second piston 230 may be integrally formed, or may be two fixedly connected separate structures. The fixed connection may include at least one of: a threaded connection, a welded connection, a riveted connection, a bonded connection, or a snapped connection.

The controllable negative stiffness actuator 400 may be of any structural form that may provide negative stiffness characteristics. In some exemplary embodiments, the controllable negative stiffness actuator 400 may be a magnetic mechanism. Specifically, the controllable negative stiffness component 450 may be the magnetic mechanism. The magnetic mechanism may adjust the magnitude and direction of a magnetic field based on the control signal during operation, so as to form and adjust the negative stiffness in the vibration direction through the attraction or mutual repulsion force generated by the magnetic field in the vibration direction. In some exemplary embodiments, the controllable negative stiffness actuator 400 may also be a controllable negative stiffness spring mechanism. Specifically, the controllable negative stiffness component 450 may be the controllable negative stiffness spring mechanism. The controllable negative stiffness spring mechanism may include at least one controllable stiffness spring distributed at a preset included angle with the vibration direction, so as to form the negative stiffness in the vibration direction. The controllable negative stiffness spring mechanism may adjust the negative stiffness based on the control signal during operation.

Figure 3A:
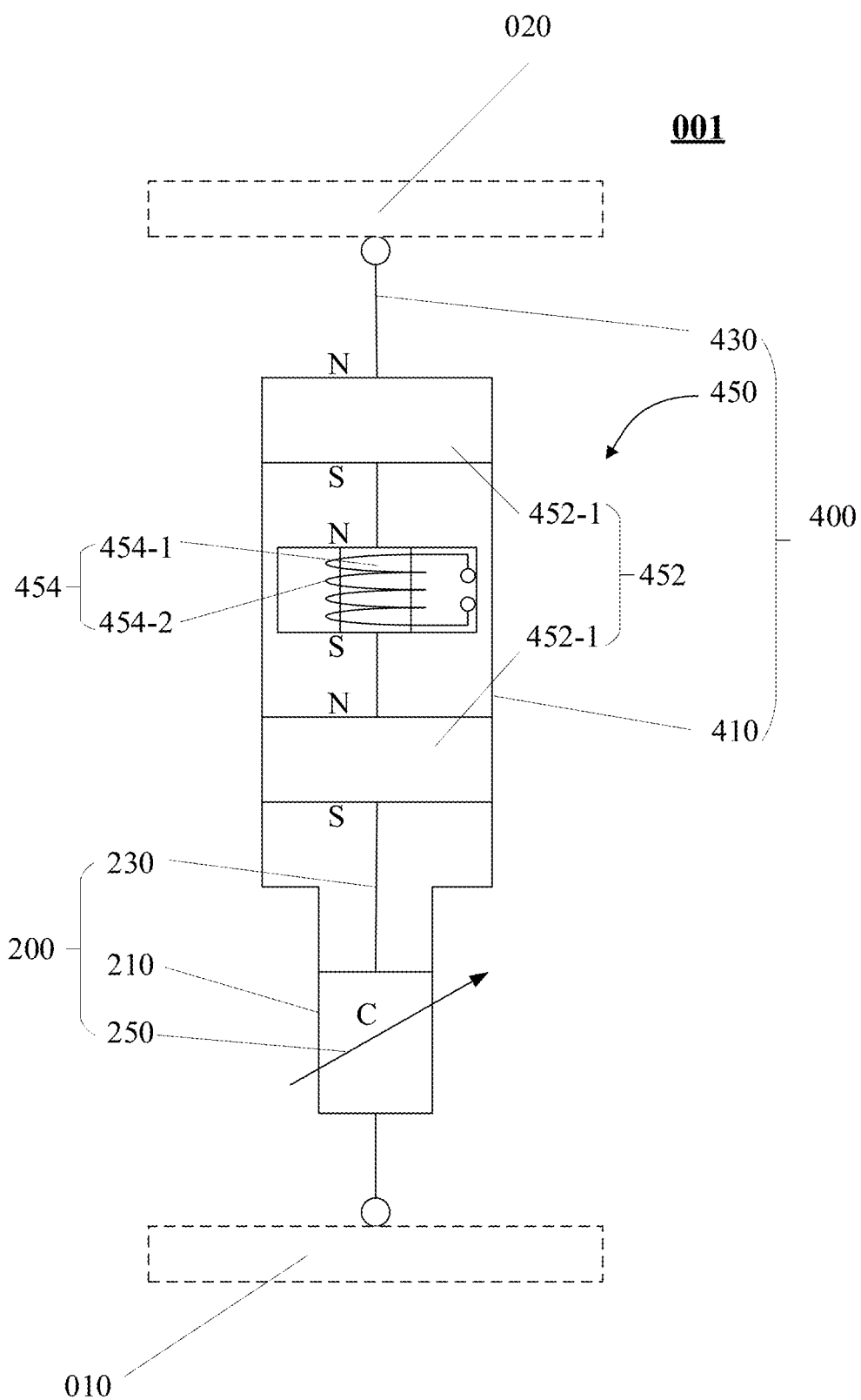
FIG. 3A is a structural diagram of a vibration damping actuator provided according to some exemplary embodiments of the present disclosure.
Figure 3B:
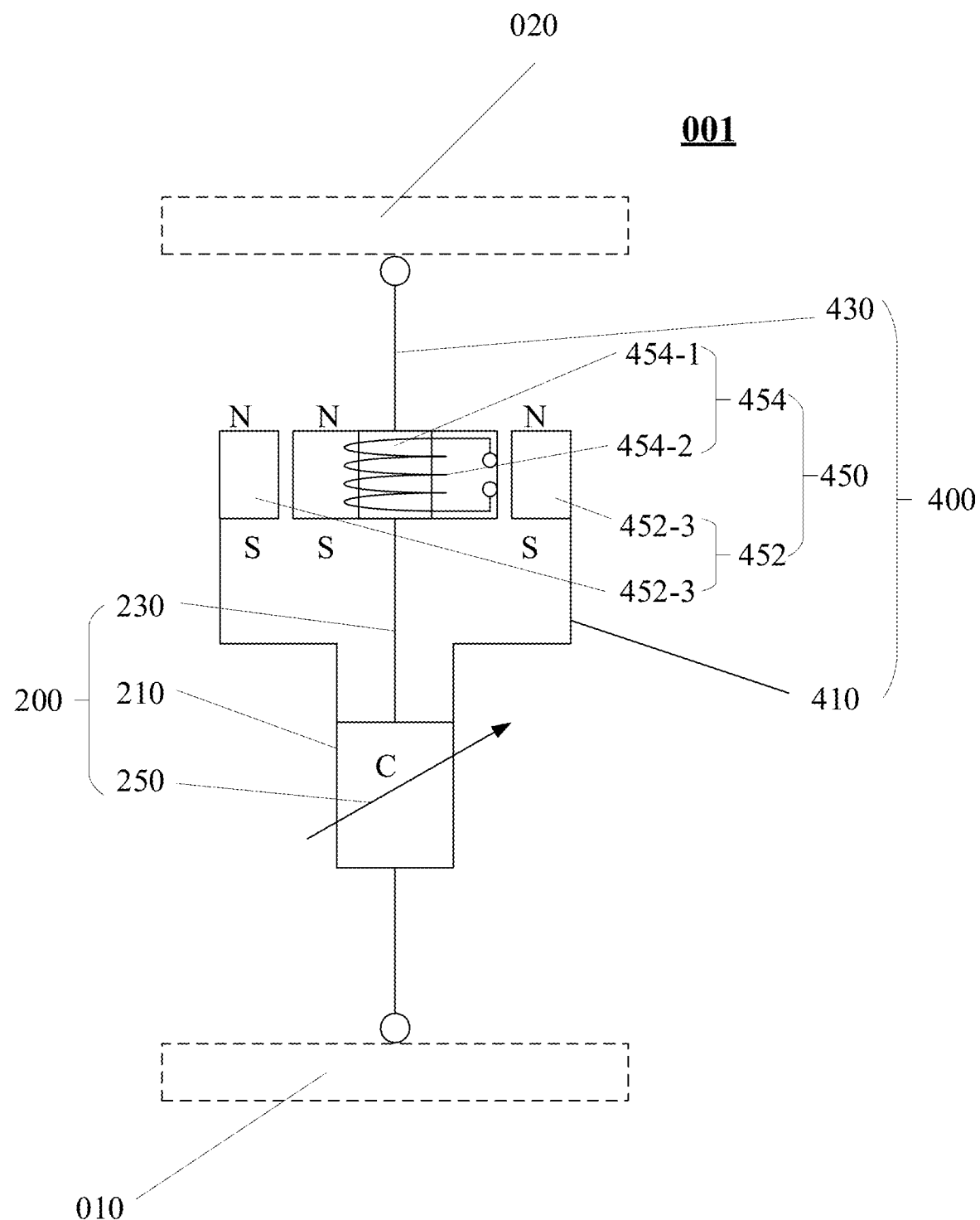
FIG. 3B is a structural diagram of a vibration damping actuator provided according to some exemplary embodiments of the present disclosure.
Figure 3C:
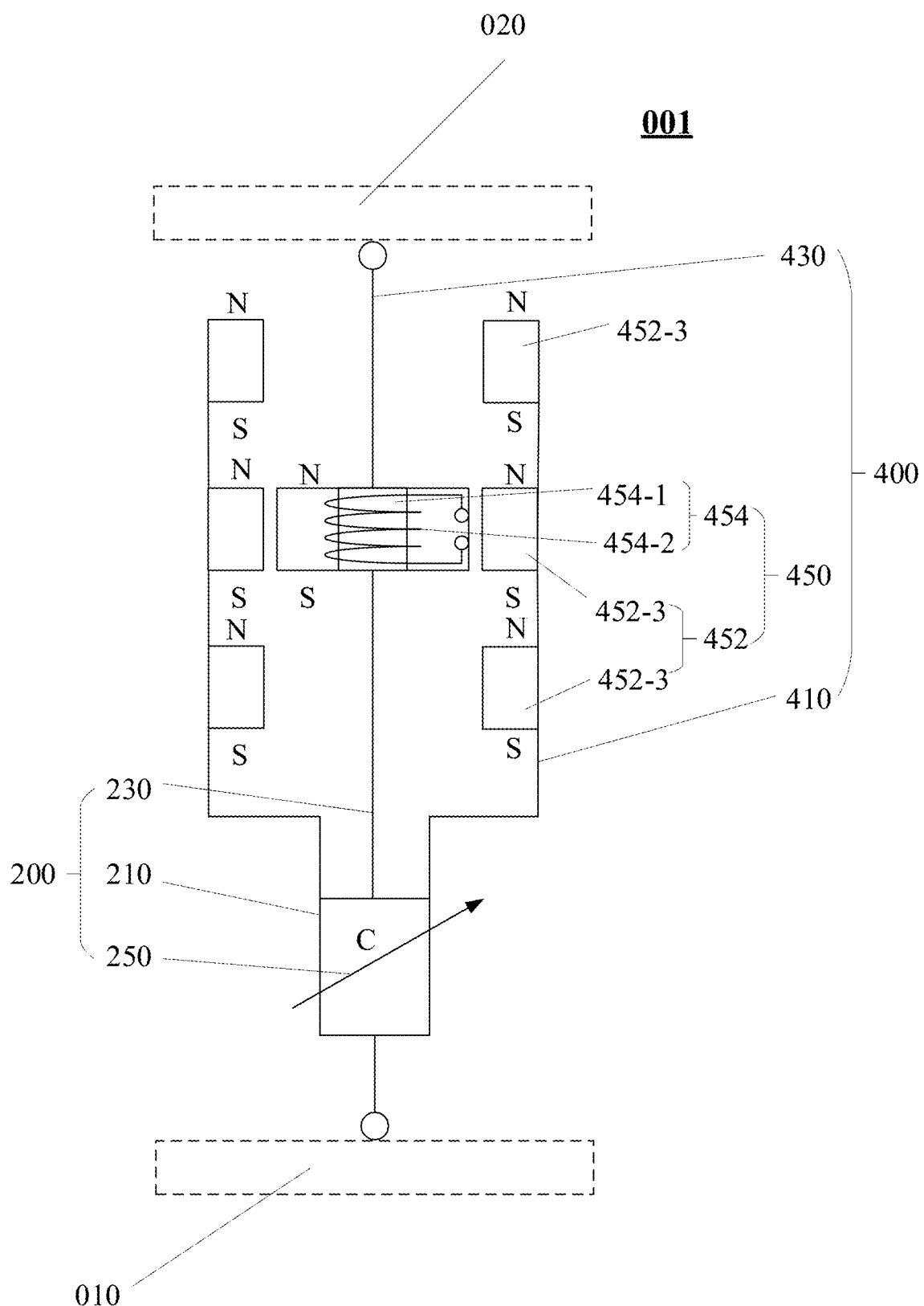
FIG. 3C is a structural diagram of a vibration damping actuator provided according to some exemplary embodiments of the present disclosure.
Figure 3D:
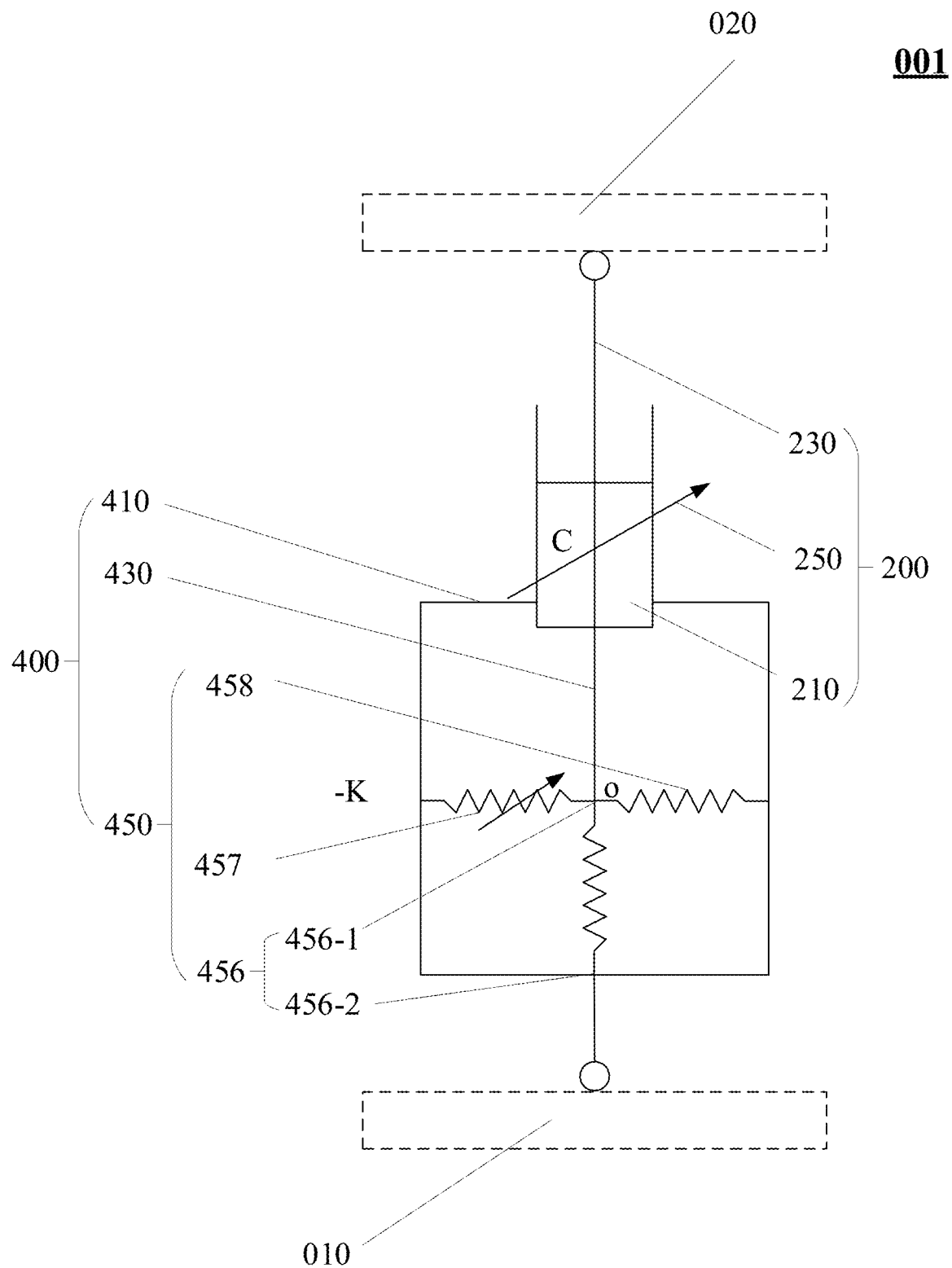
FIG. 3D is a structural diagram of a vibration damping actuator provided according to some exemplary embodiments of the present disclosure.

FIG. 3A is a structural diagram of a vibration damping actuator 001 provided according to some exemplary embodiments of the present disclosure; FIG. 3B is a structural diagram of a vibration damping actuator 001 provided according to some exemplary embodiments of the present disclosure; FIG. 3C is a structural diagram of a vibration damping actuator 001 provided according to some exemplary embodiments of the present disclosure; and FIG. 3D is a schematic sketch of a vibration damping actuator 001 provided according to some exemplary embodiments of the present disclosure. The controllable negative stiffness component 450 of the controllable negative stiffness actuator 400 in the vibration damping actuator 001 shown in FIG. 3A to FIG. 3C may be the magnetic mechanism. The controllable negative stiffness component 450 of the controllable negative stiffness actuator 400 in the vibration damping actuator 001 shown in FIG. 3D may be the controllable negative stiffness spring mechanism.

As shown in FIG. 3A to FIG. 3C, the magnetic mechanism (that is, the controllable negative stiffness component 450) may include a first magnetic device 452 and a second magnetic device 454.

The first magnetic device 452 may generate a magnetic field. The first magnetic device 452 may have a magnetic pole distribution direction parallel to the vibration direction. For example, when the vibration direction is in a vertical direction, the N pole and S pole of the first magnetic device 452 may also be distributed in the vertical direction.

The second magnetic device 454 may also generate a magnetic field. The second magnetic device 454 may include a magnetic pole distribution direction the same as that of the first magnetic device 452. In other words, the second magnetic device 454 may include an N pole direction the same as that of the first magnetic device 452, and the second magnetic device 454 may include an S pole direction the same as that of the first magnetic device 452. The second magnetic device 454 may be slidably connected to the first magnetic device 452 in the vibration direction, so as to change the distance from the first magnetic device 452 in the vibration direction to generate the negative stiffness.

The first magnetic device 452 and the second magnetic device 454 may be installed on the first cylinder 410 and the first piston rod 430 respectively. In some exemplary embodiments, the first magnetic device 452 may be installed inside the first cylinder 410, and the second magnetic device 454 may be installed on the first piston rod 430. In some exemplary embodiments, the first magnetic device 452 may be installed on the first piston rod 430, and the second magnetic device 454 may be installed inside the first cylinder 410. In the vibration damping actuator shown in FIG. 3A to FIG. 3C, the conditions that the first magnetic device 452 may be installed inside the first cylinder 410, and the second magnetic device 454 may be installed on the first piston rod 430 are taken as examples for description.

At least one of the first magnetic device 452 or the second magnetic device 454 may be an electromagnet. The electromagnet may change the magnitude and direction of the magnetic field based on the control signal during operation, so as to adjust the negative stiffness. In some exemplary embodiments, the first magnetic device 452 may be a permanent magnet, and the second magnetic device 454 may be the electromagnet. In some exemplary embodiments, the first magnetic device 452 and the second magnetic device 454 may both be the electromagnets. The first magnetic device 452 may be the electromagnet, and the second magnetic device 454 may be the permanent magnet. In the vibration damping actuator shown in FIG. 3A to FIG. 3C of some exemplary embodiments of the present disclosure, the first magnetic device 452 may be the permanent magnet, and the second magnetic device 454 may be the electromagnet. At this time, the electromagnet may include an iron core 454-1 and an electromagnetic coil 454-2. The electromagnetic coil 454-2 may be electrically connected to the control system during operation, and may adjust the magnitude of a current passing through the electromagnetic coil 454-2 based on the control signal to control the magnetic field intensity of the electromagnetic coil 454-2, so as to adjust the negative stiffness.

In some exemplary embodiments, the first magnetic device 452 and the second magnetic device 454 may be arranged in the vibration direction to generate the attraction force in the vibration direction, so as to generate the negative stiffness, as shown in FIG. 3A. The first magnetic device 452 may include two magnetic bodies 452-1. For convenience of description, the conditions that the two magnetic substances 452-1 are both permanent magnets and the second magnetic device 454 is the electromagnet are taken as examples for description.

The two magnetic bodies 452-1 may be relatively fixedly connected and arranged oppositely at intervals in the vibration direction, and may have the same magnetic pole distribution direction, that is, the two magnetic bodies 452-1 may have the same N pole direction and the same S pole direction. When the two magnetic bodies 452-1 are installed on the first cylinder 410, the two magnetic bodies 452-1 may be respectively installed on both ends of the first cylinder 410 in the vibration direction, and may be relatively fixed, so that the two magnetic bodies are arranged oppositely at intervals in the vibration direction. When the two magnetic bodies 452-1 are installed on the first piston rod 430, the two magnetic bodies 452-1 may be respectively installed on both ends of the first piston rod 430 in the vibration direction, and are relatively fixed, so that the two magnetic bodies are arranged oppositely at intervals in the vibration direction.

The second magnetic device 454 may be located between the two magnetic bodies 452-1, and may attract to the two magnetic bodies 452-1 in the vibration direction. The second magnetic device 454 may move between the two magnetic bodies 452-1 during operation. When the second magnetic device 454 is located at a central position of the two magnetic bodies 452-1, the distances between the two magnetic bodies 452-1 and the second magnetic device 454 are the same, and the attraction forces to the second magnetic device 454 are also the same and cancel each other out. At this time, the second magnetic device 454 may be in an equilibrium position. A resultant force of the two magnetic bodies 452-1 on the second magnetic device 454 is zero. When the first object 010 and the second object 020 vibrate relative to each other, the relative vibration between the first cylinder 410 and the first piston rod 430 may be caused. The second magnetic device 454 and the two magnetic bodies 452-1 also vibrate relative to each other in the vibration direction. At this time, the second magnetic device 454 is away from the equilibrium position, and the distances between the two magnetic bodies 452-1 and the second magnetic device 454 are not the same. The direction of a resultant force of the two magnetic bodies 452-1 on the second magnetic device 454 may be the same as the vibration direction of the second magnetic device 454 relative to the two magnetic bodies 452-1, so that the magnetic mechanism may include the negative stiffness.

In some exemplary embodiments, the first magnetic device 452 and the second magnetic device 454 may be arranged in the direction perpendicular to the vibration direction to generate the attraction force in the direction perpendicular to the vibration direction and a mutual repulsion force in the vibration direction, so as to generate the negative stiffness, as shown in FIG. 3B and FIG. 3C. The first magnetic device 452 may include at least one ring-like magnetic body 452-3. For the convenience of description, the conditions that the at least one ring-like magnetic substance 452-3 is a permanent magnet and the second magnetic device 454 is the electromagnet are taken as examples for description.

The at least one ring-like magnetic body 452-3 may be fixedly connected and arranged oppositely at intervals in the vibration direction, and may have the same magnetic pole distribution direction. In other words, the at least one ring-like magnetic body 452-3 may have the same N pole direction and the same S pole direction. The at least one ring-like magnetic body 452-3 may be installed on the first cylinder 410 or the first piston rod 430.

The second magnetic device 454 may be located in a ring of the at least one ring-like magnetic body 452-3, and may be coaxial with the ring. The second magnetic device 454 attract each other with the first magnetic device 452 in a radial direction of the ring. When a center of the second magnetic device 454 in the vibration direction is the same as a center of the first magnetic device 452 in the vibration direction, the second magnetic device 454 may be in an equilibrium position. At this time, a resultant force of the first magnetic device 452 on the second magnetic device 454 is zero. When the first object 010 and the second object 020 vibrate relative to each other, the relative vibration between the first cylinder 410 and the first piston rod 430 may be caused. The second magnetic device 454 and the at least one ring-like magnetic body 452-3 may also vibrate relative to each other in the vibration direction. At this time, the second magnetic device 454 is away from the equilibrium position, and a mutual repulsion force is generated between the first magnetic device 452 and the second magnetic device 454 in the vibration direction. The direction of a resultant force of the first magnetic device 452 on the second magnetic device 454 may be the same as the vibration direction of the second magnetic device 454 relative to the at least one ring-like magnetic body 452-3, so that the magnetic mechanism may include the negative stiffness.

In some exemplary embodiments, there may be one ring-like magnetic body 452-3, as shown in FIG. 3B. In some exemplary embodiments, there may be a plurality of ring-like magnetic bodies 452-3, as shown in FIG. 3C. When there is a plurality of ring-like magnetic bodies 452-3, the plurality of ring-like magnetic bodies 452-3 may be arranged oppositely at intervals in the vibration direction, and the central axes of the plurality of ring-like magnetic bodies 452-3 may be the same. The plurality of ring-like magnetic bodies 452-3 may be evenly distributed in the vibration direction, or may be unevenly distributed. The plurality of ring-like magnetic bodies 452-3 may enable the vibration damping actuator 001 to realize nonlinear controllable negative stiffness within any stroke range, and may expand the applications of the vibration damping actuator 001.

As shown in FIG. 3D, the controllable negative stiffness spring mechanism (i.e., the controllable negative stiffness component 450) may include a first spring 456, a second spring 457 and a third spring 458.

The first spring 456 may be arranged in the vibration direction. The first spring 456 may include a first end 456-1 and a second end 456-2. The first end 456-1 and the second end 456-2 may be connected to the first cylinder 410 and the first piston rod 430 respectively. In some exemplary embodiments shown in FIG. 3D, the second end 456-2 may be connected to the first cylinder 410. The first end 456-1 may be connected to the first piston rod 430, so as to be connected to the controllable damping actuator 200.

The second spring 457 may be arranged in a direction at the preset angle with the vibration direction. One end of the second spring 457 may be connected to the first end 456-1, and the other end may be fixedly connected to the second end 456-2. In some exemplary embodiments shown in FIG. 3D, the other end of the second spring 457 may be connected to the first cylinder 410, so as to fixedly connected to the second end 456-2. The preset angle may be a right angle or an acute angle.

The third spring 458 may be arranged symmetrically with the second spring 457 with respect to the first spring 456. One end of the third spring 458 may be connected to the first end 456-1. The other end of the third spring 458 may be connected to the first cylinder 410, so as to fixedly connected to the second end 456-2.

At least one of the second spring 457 or the third spring 458 may be a controllable stiffness spring. The controllable stiffness spring may be electrically connected to the control system during operation, so as to control the stiffness. As shown in FIG. 3D, one end of the first spring 456, one end of the second spring 457 and one end of the third spring 458 are jointly connected to a point 0 (the first end 456-1). When the second spring 457 and the third spring 458 are compressed to a direction perpendicular to the vibration direction (the horizontal direction as shown in FIG. 3D), only the first spring 456 provides a bearing capacity in the vibration direction (the vertical direction as shown in FIG. 3D). The second spring 457 and the third spring 458 do not affect the restoring force. The second spring 457 and the third spring 458 may provide the negative stiffness in the vibration direction (the vertical direction as shown in FIG. 3D). The control system may control the stiffness of the controllable stiffness spring based on the control signal, so as to adjust the negative stiffness. The controllable damping actuator 200 may be connected to the first end 456-1 (the point 0), thereby coupling the controllable damping with the controllable negative stiffness.

It should be noted that the controllable damping actuator 200 in the vibration damping actuator 001 shown in FIG. 3A to FIG. 3D may be any controllable damping actuator 200 described in the present disclosure.

Figure 4:
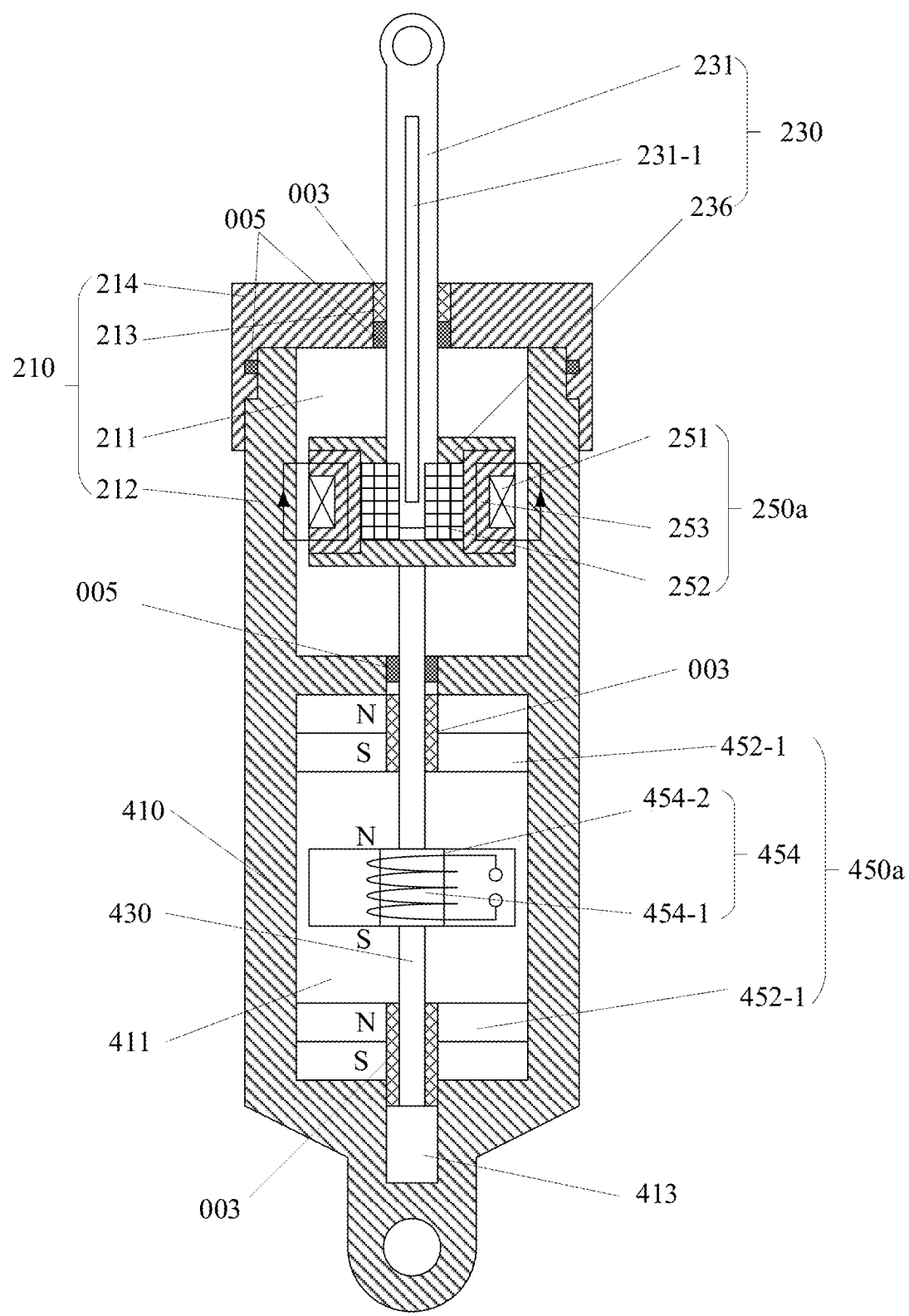
FIG. 4 is a structural diagram of a vibration damping actuator provided according to some exemplary embodiments of the present disclosure.

FIG. 4 is a structural diagram of a vibration damping actuator 001 provided according to some exemplary embodiments of the present disclosure. The controllable damping actuator 200, which may include the second cylinder 210, the second piston 230, and the controllable damping component 250, may be connected to the controllable negative stiffness actuator 400 in the vertical direction. The controllable damping component 250 may be a magnetorheological vibration damper 250a. At this time, the damping fluid may be magnetorheological fluid. The controllable negative stiffness component 450 may be the magnetic mechanism 450a.

As shown in FIG. 4, the overall structure of the vibration damping actuator 001 may be a cylinder shape. The first cylinder 410 may be connected to the second cylinder 210 in a vibration damping direction (i.e., the vertical direction). The second cylinder 210 may be located on an upper part of the first cylinder 410, so as to divide the vibration damping actuator 001 into an upper space 211 and a lower space 411. The upper space 211 may be a cavity of the second cylinder 210. The lower space 411 may be a cavity of the first cylinder 410. The upper space 211 may be used to install a controllable damping component 250, that is, the magnetorheological vibration damper 250a. The lower space 411 may be used to arrange the controllable negative stiffness component 450, that is, the magnetic mechanism 450a. The first cylinder 410 and the second cylinder 210 may be an integrated structure, or may be two fixedly connected separate structures.

As shown in FIG. 4, the second cylinder 210 may include a cylinder body 212 and an end cover 214. The end cover 214 may be enclosed with the cylinder body 212 to form the upper space 211. The end cover 214 and an upper part of the cylinder body 212 may be tightly connected through an interference fit. The second piston 230 may include a piston rod 231 and a piston body 236. A bottom end of the piston rod 231 may be connected to the piston body 236 through threads. An upper end face of the piston body 236 may be drilled to form a threaded hole, which may match an external thread of the piston rod 231 to ensure the reliability of the assembly. The first piston rod 430 may be fixedly connected to the piston rod 231, so as to be fixedly connected to the piston body 236. In some exemplary embodiments, an inner hole 231-1 may be formed in the middle of the piston rod 231 to accommodate wires.

A shackle structure at the bottom of the first cylinder 410 and the top of the piston rod 231 may be used to connect the vibration damping actuator 001 with the first object 010 and the second object 020. When the first object 010 and the second object 020 vibrate relative to each other in the vibration direction, the piston rod 231 may drive the first piston rod 430 to vibrate relative to the first cylinder 410 and the second cylinder 210 in the vibration direction. In order to ensure that the movement direction of the piston rod 231 and the first piston rod 430 relative to the first cylinder 410 and the second cylinder 210 is the vibration direction, a first guide groove 413 may be formed in the first cylinder 410. A second guide groove 213 may be formed in the second cylinder 210. The first guide groove 413 and the second guide groove 213 may be coaxial and extend in the vibration direction. The first piston rod 430 may be matched with the first guide groove 413, and the piston rod 231 may be matched with the second guide groove 213. The second guide groove 213 may be formed in the end cover 214. In addition, the second guide groove 213 may include a through hole, so that the piston rod 231 may pass through the second guide groove 213. In some exemplary embodiments, sliding bearings 003 may be arranged in the first guide groove 413 and the second guide groove 213. The sliding bearings 003 may guide and lubricate the movement of the piston rod 231 and the first piston rod 430.

In some exemplary embodiments, to ensure sealing performance, a sealing ring 005 may be installed between the second guide groove 213 and the piston rod 231. The sealing ring 005 may ensure the sealing effect of the magnetorheological fluid filled in the cavity. In some exemplary embodiments, the sealing ring 005 may also be installed on a circumferential surface in which the cylinder body 212 is matched with the end cover 214, so as to prevent leakage of the magnetorheological fluid. In some exemplary embodiments, the contact surface of the end cover 214 and the cylinder body 212 may be machined into a stepped structure. The sealing ring 005 may be installed between the bottom of the upper space 211 of the cylinder body 212 and the first piston rod 430, so as to prevent the magnetorheological fluid filled in the upper space 211 from leaking into the lower space 411.

The upper space 211 may be used to install the magnetorheological vibration damper 250a. As previously mentioned, in some exemplary embodiments, the controllable damping component 250 may be installed on the second cylinder 210. In some exemplary embodiments, the controllable damping component 250 may also be installed on the second piston 230. In the vibration damping actuator 001 shown in FIG. 4, the magnetorheological vibration damper 250a may be installed on the piston body 236. The magnetorheological vibration damper 250a may include an electromagnetic coil 251. In some exemplary embodiments, the magnetorheological vibration damper 250a may further include a coil support 253 and an iron core 252. In order to distinguish it from the electromagnet in the second magnetic device 454, the electromagnetic coil 251 is defined as the second electromagnetic coil 251 here, and the iron core 252 is defined as the second iron core 252.

The second electromagnetic coil 251 may be installed on the second cylinder 210 or the second piston 230. In the vibration damping actuator 001 shown in FIG. 4, the second electromagnetic coil 251 may be installed on the piston body 236 in the second piston 230. The second electromagnetic coil 251 may be electrically connected to the control system during operation, and may control a current passing through the second electromagnetic coil 251 based on the control signal, so as to control an intensity of the magnetic field, change a viscosity and fluidity of the magnetorheological fluid, and further adjust the damping.

In some exemplary embodiments, the magnetorheological vibration damper 250a may also include the coil support 253. The coil support 253 may include a wire slot. The wire slot may be located outside the coil support 253 and recessed into the inside of the coil support 253 to form a groove-like structure. The second electromagnetic coil 251 may be wound in the wire slot. The wire slot may increase the number of turns of the second electromagnetic coil 251 and may ensure the tidiness of the second electromagnetic coil 251. The coil support 253 may be installed on the second cylinder 210 or the second piston 230. Specifically, the coil support 253 may be installed on the same part as the second electromagnetic coil 251. In the vibration damping actuator 001 shown in FIG. 4, the coil support 253 may be installed on the piston body 236 in the second piston 230. In some exemplary embodiments, a radial hole may be formed in the coil support 253 for accommodating wires. The wires of the second electromagnetic coil 251 may pass through the radial hole on the coil support 253 and the inner hole 231-1 of the piston rod 231 sequentially to be connected to outer leads.

In some exemplary embodiments, the magnetorheological vibration damper 250a may also include the second iron core 252. The second iron core 252 may be installed on the second electromagnetic coil 251. A through hole having the same axis with the coil support may be formed inside the coil support 253. The second iron core 252 may be embedded in the through hole of the coil support 253, and the upper and lower end faces may be aligned, so as to enhance the magnetism of the magnetic field formed by the second electromagnetic coil 251. A threaded hole may be formed in the center of the second iron core 25 for connection with the piston rod 231. The coil support 253 and the second iron core 252 may be fixed in the middle position of the piston body 236.

As shown in FIG. 4, the magnetorheological fluid may be filled in the upper space 211 of the cylinder body 212. The second electromagnetic coil 251 may be opposite to the second cylinder 210 in a direction perpendicular to the vibration direction. A magnetorheological fluid gap may exist between the piston body 236 of the second piston 230 and the cylinder body 212. At this time, the magnetorheological vibration damper 250a may work in a shear-flow hybrid mode. An actuation field generated after the second electromagnetic coil 251 may be energized passes through the fluid gap between the piston body 236 and the cylinder body 212 through the second iron core 252. The control system may control the intensity of the magnetic field by changing the magnitude of the current applied to the second electromagnetic coil 251, so as to change the viscosity and fluidity of the magnetorheological fluid in the fluid gap, and further change the magnitude of the generated damping force.

The lower space 411 may be used to arrange the controllable negative stiffness component 450, that is, the magnetic mechanism 450a. As previously mentioned, the magnetic mechanism 450a may include the first magnetic device 452 and the second magnetic device 454. The first magnetic device 452 may include two magnetic bodies 452-1. The two magnetic bodies 452-1 may be permanent magnets. The two magnetic bodies 452-1 may be fixedly installed at the top and bottom of the lower space 411 of the vibration damping actuator 001 respectively. The second magnetic device 454 may be located between the two magnetic bodies 452-1, and may be fixedly connected to the first piston rod 430. The second magnetic device 454 may be an electromagnet. The second magnetic device 454 may include an electromagnetic coil 454-2 and an iron core 454-1. In order to distinguish it from the magnetorheological vibration damper 250a, the electromagnetic coil 454-2 may be defined as the first electromagnetic coil 454-2, and the iron core 454-1 may be defined as the first iron core 454-1 respectively. As shown in FIG. 4, the first piston rod 430 may pass through the magnetic bodies 452-1 to be connected to the second piston 230. Thus, the two magnetic bodies 452-1 and the second magnetic device 454 may have an annular shape. The two magnetic bodies 452-1 and the second magnetic device 454 may have the same magnetic pole distribution direction. In some exemplary embodiments, sliding bearings 003 may be installed between the first piston rod 430 and the two magnetic bodies 452-1 fixed on the cylinder body 212, so as to reduce friction during relative movement. The sliding connection between the first piston rod 430 and the first cylinder 410 may ensure the coaxiality of the second magnetic device 454 and the cylinder body 212 during up and down movement, and plays a good guiding role in the movement of the second magnetic device 454.

When the second magnetic device 454 is located at a central position of the two magnetic bodies 452-1, a resultant force on the second magnetic device 454 is zero. At this time, the second magnetic device 454 is in an equilibrium position. When the second magnetic device 454 vibrates away from the equilibrium position to move up or down, a direction of a resultant force of the two magnetic bodies 452-1 on the second magnetic device 454 may be the same as its movement direction, so that the second magnetic device 454 and the first piston rod 430 may include the negative stiffness characteristics. The top of the first piston rod 430 may be fixedly connected to the piston body 236, so that the negative stiffness characteristics formed by the magnetic mechanism 450a may be transmitted to the second piston 230. The damping characteristics of the magnetorheological vibration damper 250a may be superimposed on the negative stiffness characteristics of the magnetic mechanism 450a to obtain the characteristics of the vibration damping actuator 001.

Figure 5:
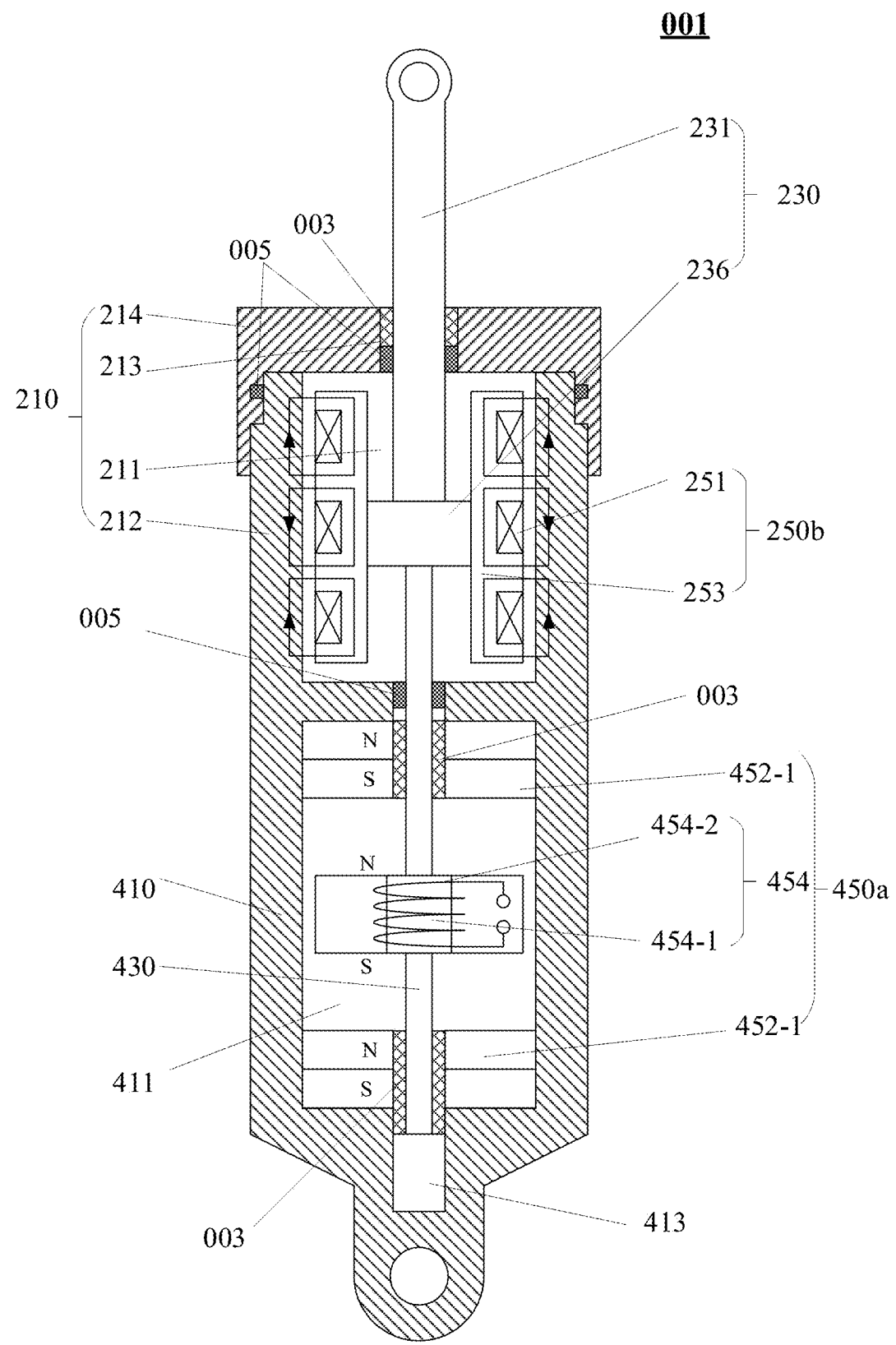
FIG. 5 is a structural diagram of a vibration damping actuator provided according to some exemplary embodiments of the present disclosure.

FIG. 5 is a structural diagram of a vibration damping actuator 001 provided according to some exemplary embodiments of the present disclosure. The controllable damping actuator 200 may be connected to the controllable negative stiffness actuator 400 in the vertical direction. The controllable damping component 250 may be a magnetorheological vibration damper 250b. At this time, the damping fluid may be magnetorheological fluid. The controllable negative stiffness component 450 may be the magnetic mechanism 450a. The structures of the first cylinder 410, the first piston rod 430 and the second cylinder 210 and the second piston 230 in FIG. 5 may be the same as those in FIG. 4, and are not repeated here.

As shown in FIG. 5, an upper space 211 may be used to install the magnetorheological vibration damper 250b. The magnetorheological fluid may be filled in the upper space 211. As previously mentioned, in some exemplary embodiments, the controllable damping component 250 may be installed on the second cylinder 210. In some exemplary embodiments, the controllable damping component 250 may also be installed on the second piston 230. In the vibration damping actuator 001 shown in FIG. 5, the magnetorheological vibration damper 250b may be installed on the piston body 236. The magnetorheological vibration damper 250b may include a second electromagnetic coil 251 and a coil support 253.

The coil support 253 may be fixedly installed in the upper space 211 of the cylinder body 212. The second electromagnetic coil 251 may be wound on the coil support 253. A gap may exist between the coil support 253 and the cylinder body 212. During up and down movement of the piston body 236, the magnetorheological fluid may flow in the gap between the cylinder body 212 and the coil support 253. The control system may change the viscosity of the magnetorheological fluid by changing the magnitude of the current applied to the second electromagnetic coil 251, thus generates the controllable damping force.

Two magnetic bodies 452-1 may be installed at the top and bottom of the lower space 411 of the cylinder body 212 respectively. The two magnetic bodies 452-1 may both be permanent magnets. A second magnetic device 454 which may move up and down may be arranged between the two magnetic bodies 452-1. The second magnetic device 454 may be an electromagnet. The movement direction of the second magnetic device 454 may be ensured by the sliding connection between the first piston rod 430 and the first guide groove 413 and the sliding connection between the piston rod 231 and the second guide groove 213. The control system may generate the controllable negative stiffness by changing the magnitude of the current applied to the first electromagnetic coil 454-2 in the second magnetic device 454.

Figure 6:
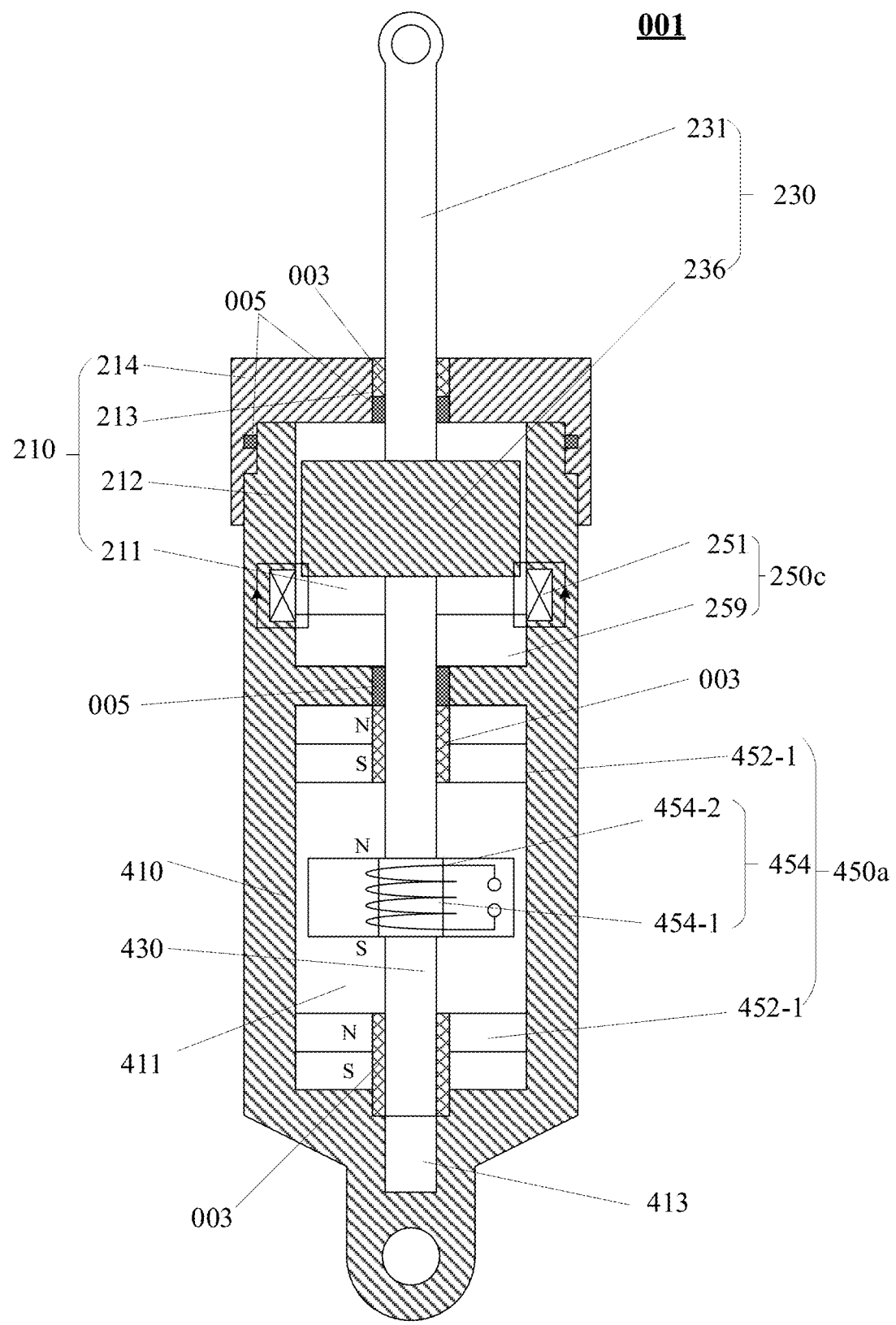
FIG. 6 is a structural diagram of a vibration damping actuator provided according to some exemplary embodiments of the present disclosure.

FIG. 6 is a structural diagram of a vibration damping actuator 001 provided according to some exemplary embodiments of the present disclosure. The controllable damping actuator 200 may be connected to the controllable negative stiffness actuator 400 in the vertical direction. The controllable damping component 250 may be a magnetorheological vibration damper 250c. At this time, the damping fluid may be magnetorheological fluid. The controllable negative stiffness component 450 may be the magnetic mechanism 450a. The structures of the first cylinder 410, the first piston rod 430 and the second cylinder 210 and the second piston 230 in FIG. 6 may be the same as those in FIG. 4, and are not repeated here.

As shown in FIG. 6, an upper space 211 of the cylinder body 212 may be used to install the magnetorheological vibration damper 250c. The magnetorheological fluid is filled in the upper space 211. As previously mentioned, in some exemplary embodiments, the controllable damping component 250 may be installed on the second cylinder 210. In some exemplary embodiments, the controllable damping component 250 may also be installed on the second piston 230. In the vibration damping actuator 001 shown in FIG. 6, the magnetorheological vibration damper 250c may be installed on the cylinder body 212. The magnetorheological vibration damper 250c may include a second electromagnetic coil 251. The magnetorheological vibration damper 250c may also include a bottom plate 259.

The second electromagnetic coil 251 may be installed on the second cylinder 210 or the second piston 230. In the vibration damping actuator 001 shown in FIG. 6, the second electromagnetic coil 251 may be installed in the cylinder body 212. The bottom plate 259 may be installed at the bottom of the cylinder body 212 and opposite to the piston body 236. The second electromagnetic coil 251 may be electrically connected to the control system during operation. When a current is applied to the second electromagnetic coil 251, a magnetic field may be generated around the second electromagnetic coil 251. The magnetic induction lines of the magnetic field may form a closed loop through the cylinder body 212, the piston body 236, the magnetorheological fluid between the piston body 236 and the bottom plate 259, and the bottom plate 259.

Both ends of the piston body 236 may be connected to the piston rod 231 and the first piston rod 430 respectively. During the up and down movement of the piston body 236, the control system may control the magnitude of the current passing through the second electromagnetic coil 251 based on the control signal, so as to control an intensity of the magnetic field, change a viscosity and fluidity of the magnetorheological fluid between the piston body 236 and the bottom plate 259, and further adjust the damping. With the change of the magnetic field, the magnetorheological fluid may be transformed from a free-flowing liquid to a semi-solid or even a solid in a very short time, so that the magnetorheological fluid may exhibit different stiffness. When the piston body 236 and the bottom plate 259 are close to each other, the magnetorheological fluid will be squeezed, and the magnetorheological fluid of different stiffness will generate a varying damping force. At this time, the magnetorheological vibration damper 250c works in a squeeze mode.

Figure 7:
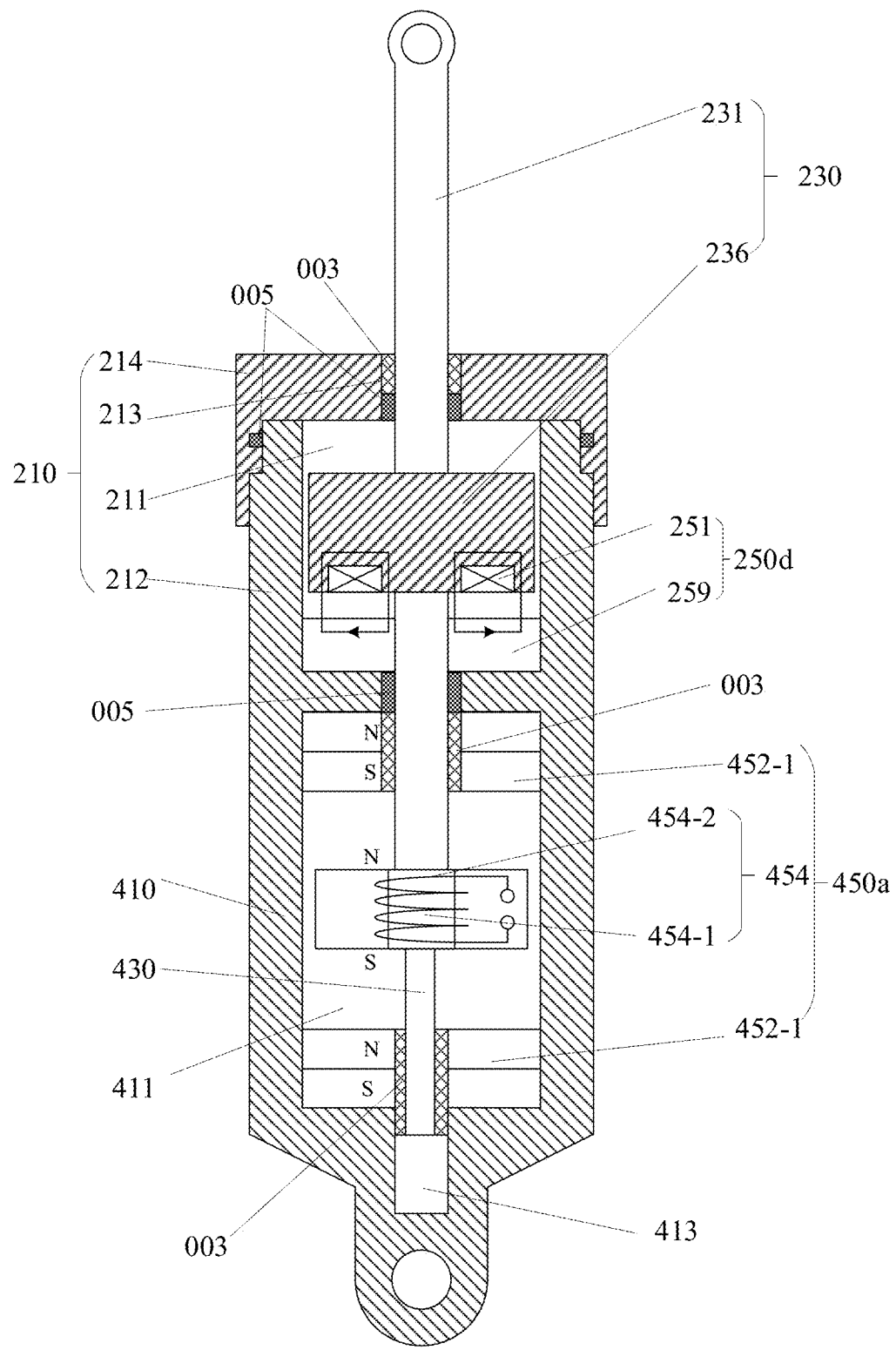
FIG. 7 is a structural diagram of a vibration damping actuator provided according to some exemplary embodiments of the present disclosure.

FIG. 7 is a structural diagram of a vibration damping actuator 001 provided according to some exemplary embodiments of the present disclosure. The controllable damping actuator 200 may be connected to the controllable negative stiffness actuator 400 in the vertical direction. The controllable damping component 250 may be a magnetorheological vibration damper 250d. At this time, the damping fluid may be magnetorheological fluid. The controllable negative stiffness component 450 may be the magnetic mechanism 450a. The structures of the first cylinder 410, the first piston rod 430 and the second cylinder 210 and the second piston 230 in FIG. 7 may be the same as those in FIG. 4, and are not repeated here.

As shown in FIG. 7, an upper space 211 of the cylinder body 212 may be used to install the magnetorheological vibration damper 250d. The magnetorheological fluid is filled in the upper space 211. As previously mentioned, in some exemplary embodiments, the controllable damping component 250 may be installed on the second cylinder 210. In some exemplary embodiments, the controllable damping component 250 may also be installed on the second piston 230. In the vibration damping actuator 001 shown in FIG. 7, the magnetorheological vibration damper 250d may be installed on the piston body 236. The magnetorheological vibration damper 250d may include a second electromagnetic coil 251 and a bottom plate 259.

As previously mentioned, the second electromagnetic coil 251 may be installed on the second cylinder 210 or the second piston 230. In the vibration damping actuator 001 shown in FIG. 7, the second electromagnetic coil 251 may be installed on the piston body 236. The second electromagnetic coil 251 may be installed at the bottom of the piston body 236 and opposite to the bottom of the second cylinder 210 in the vibration direction. The bottom plate 259 may be installed at the bottom of the cylinder body 212 and opposite to the second electromagnetic coil 251. The second electromagnetic coil 251 may be electrically connected to the control system during operation. When a current is applied to the second electromagnetic coil 251, a magnetic field may be generated around the second electromagnetic coil 251. The magnetic induction lines of the magnetic field may form a closed loop through the piston body 236, the magnetorheological fluid between the piston body 236 and the bottom plate 259, and the bottom plate 259.

Both ends of the piston body 236 may be connected to the piston rod 231 and the first piston rod 430 respectively. During the up and down movement of the piston body 236, the control system may control the magnitude of the current passing through the second electromagnetic coil 251 based on the control signal, so as to control an intensity of the magnetic field, change a viscosity and fluidity of the magnetorheological fluid between the piston body 236 and the bottom plate 259, and further adjust the damping. With the change of the magnetic field, the magnetorheological fluid may be transformed from a free-flowing liquid to a semi-solid or even a solid in a very short time, so that the magnetorheological fluid may exhibit different stiffness. When the piston body 236 and the bottom plate 259 are close to each other, the magnetorheological fluid will be squeezed, and the magnetorheological fluid of different stiffness will generate a varying damping force. At this time, the magnetorheological vibration damper 250d works in a squeeze mode.

Figure 8:
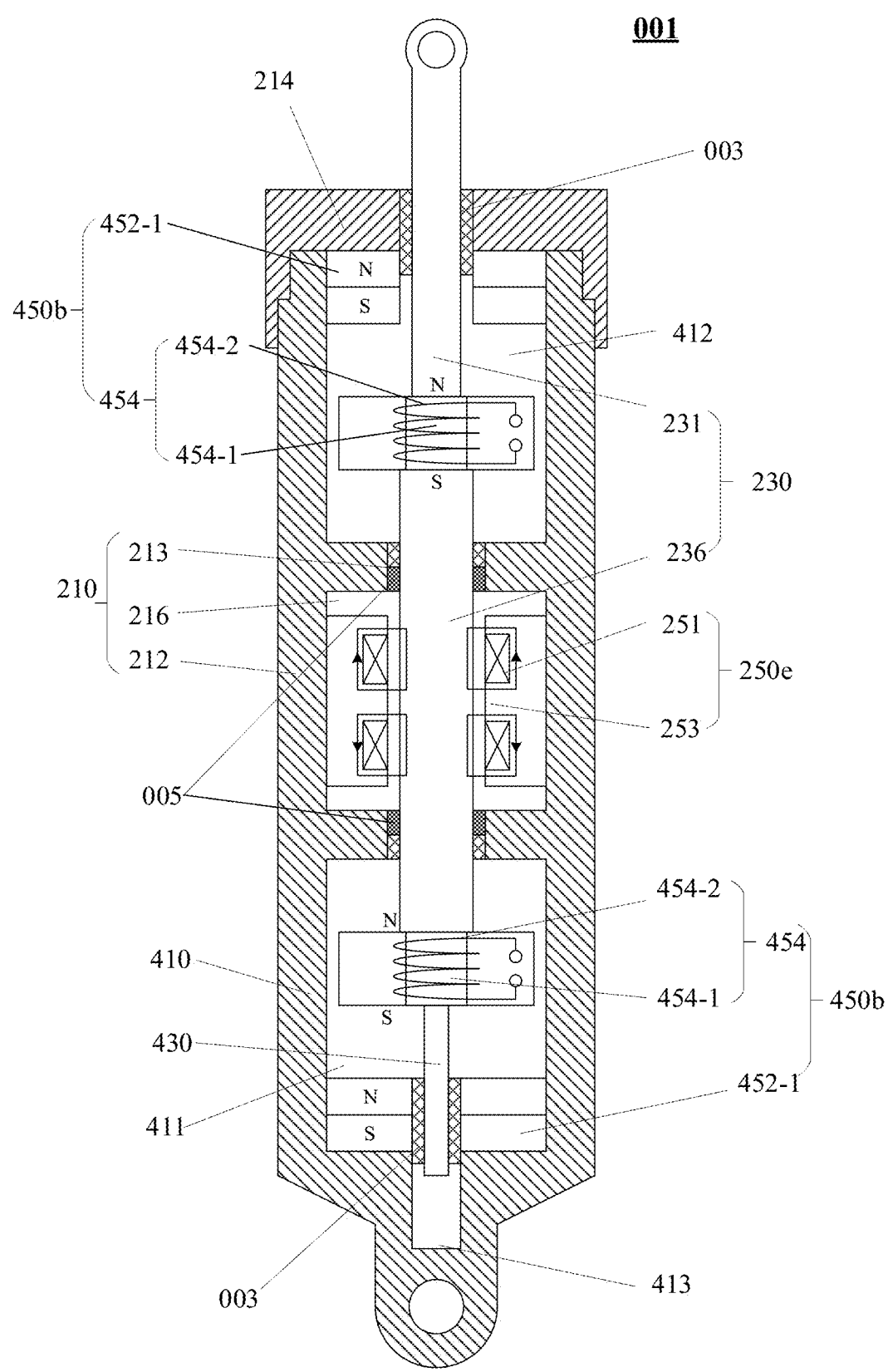
FIG. 8 is a structural diagram of a vibration damping actuator provided according to some exemplary embodiments of the present disclosure.

FIG. 8 is a structural diagram of a vibration damping actuator 001 provided according to some exemplary embodiments of the present disclosure. The controllable damping actuator 200 may be connected to the controllable negative stiffness actuator 400 in the vertical direction. The controllable damping component 250 may be a magnetorheological vibration damper 250e. At this time, the damping fluid may be magnetorheological fluid. The controllable negative stiffness component 450 may be a magnetic mechanism 450b.

As shown in FIG. 8, a first cylinder 410 and a second cylinder 210 may be connected as a whole. The first cylinder 410 may be divided into two parts which may be located on both sides of the second cylinder 210 respectively, and are fixedly connected to the second cylinder 210. The cavities in the first cylinder 410 and the second cylinder 210 may be divided into an upper space 412, a lower space 411 and a middle space 216. A sealing ring 005 may be installed between the cylinder body 212 and the piston body 236 to ensure the sealing effect of the middle space 216, so as to prevent leakage of the magnetorheological fluid. Sliding bearings 003 may be arranged between the cylinder body 212 and the piston body 236.

The middle space 216 may be used to install the magnetorheological vibration damper 250e. The magnetorheological fluid is filled in the middle space 216. The magnetorheological vibration damper 250e may include a second electromagnetic coil 251 and a coil support 253. The coil support 253 may be fixedly installed on the cylinder body 212. The second electromagnetic coil 251 is wound on the coil support 253. A gap may exist between the coil support 253 and the piston body 236. The second electromagnetic coil 251 may be electrically connected to the control system during operation. When a current is applied to the second electromagnetic coil 251, a magnetic field is generated around the second electromagnetic coil 251. The magnetic induction lines of the magnetic field may form a closed loop through the coil support 253, the second electromagnetic coil 251, the magnetorheological fluid between the second electromagnetic coil 251 and the piston body 236, and the piston body 236. During the up and down movement of the piston body 236, the magnetorheological fluid may flow in the gap between the piston body 236 and the coil support 253. The control system may change the viscosity of the magnetorheological fluid by changing the magnitude of the current applied to the second electromagnetic coil 251, and may further generate the controllable damping force. At this time, the magnetorheological vibration damper 250e works in a shear mode.

The upper space 412 and the lower space 411 may be used to install a magnetic mechanism 450b. Two magnetic bodies 452-1 may be installed at the top of the upper space 412 and the bottom of the lower space 411 respectively. The two magnetic bodies 452-1 may both be permanent magnets. A second magnetic device 454 which may move up and down may be arranged between the two magnetic bodies 452-1. The second magnetic device 454 may be an electromagnet. The second magnetic device 454 may include two electromagnets. The two electromagnets may be located in the upper space 412 and the lower space 411 respectively. The two electromagnets may be connected through the piston body 236. The lower end of the second magnetic device 454 may be connected to the first piston rod 430. The first piston rod 430 may pass through the magnetic bodies 452-1 through the sliding bearings 003 to be slidably connected to the first cylinder 410, where the sliding bearings 003 may lubricate and guide the up and down movement of the second magnetic device 454. The control system may generate the controllable negative stiffness by changing the magnitude of the current applied to the first electromagnetic coil 454-2 in the second magnetic device 454.

Figure 9A:
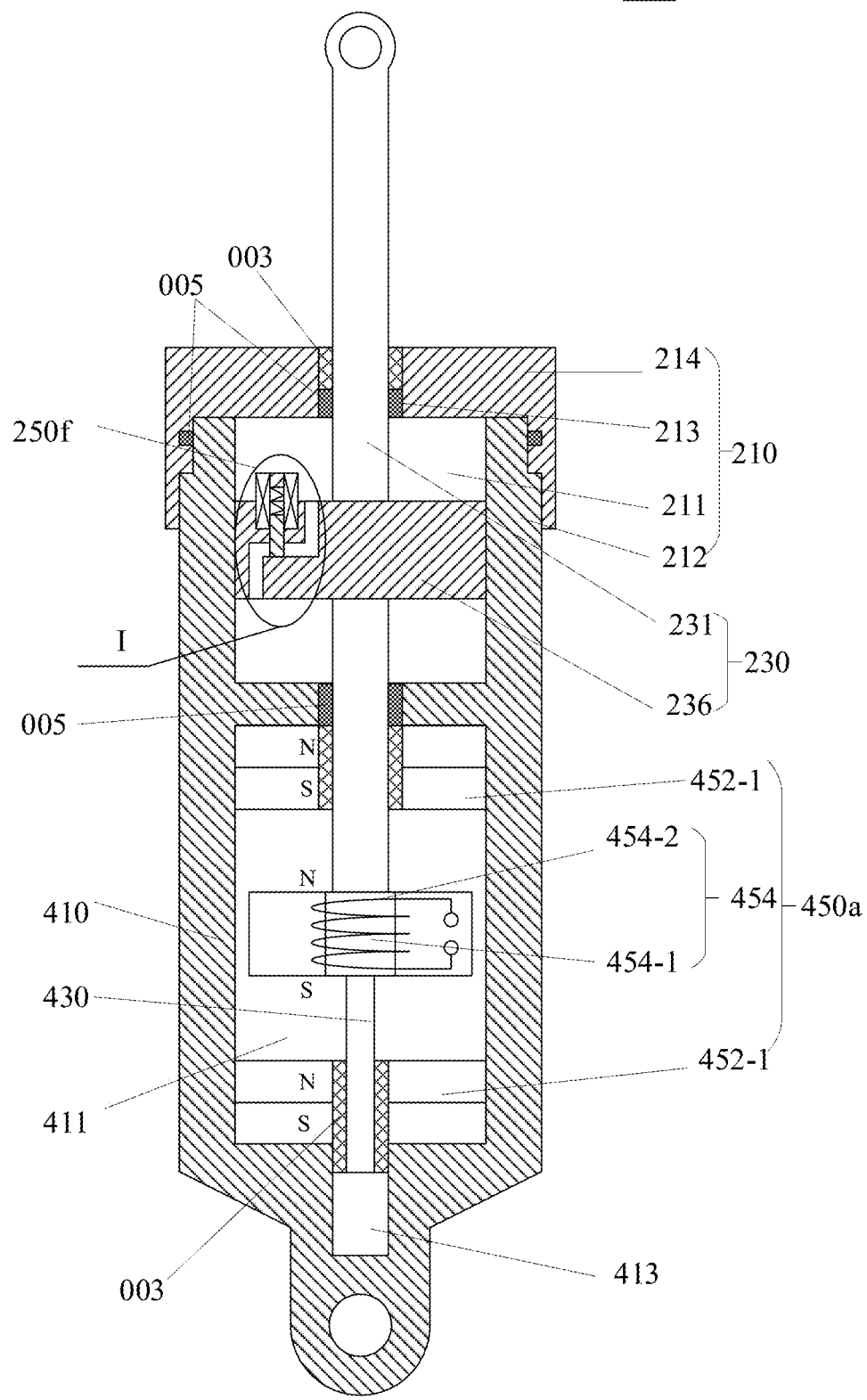
FIG. 9A is a structural diagram of a vibration damping actuator provided according to some exemplary embodiments of the present disclosure.
Figure 9B:
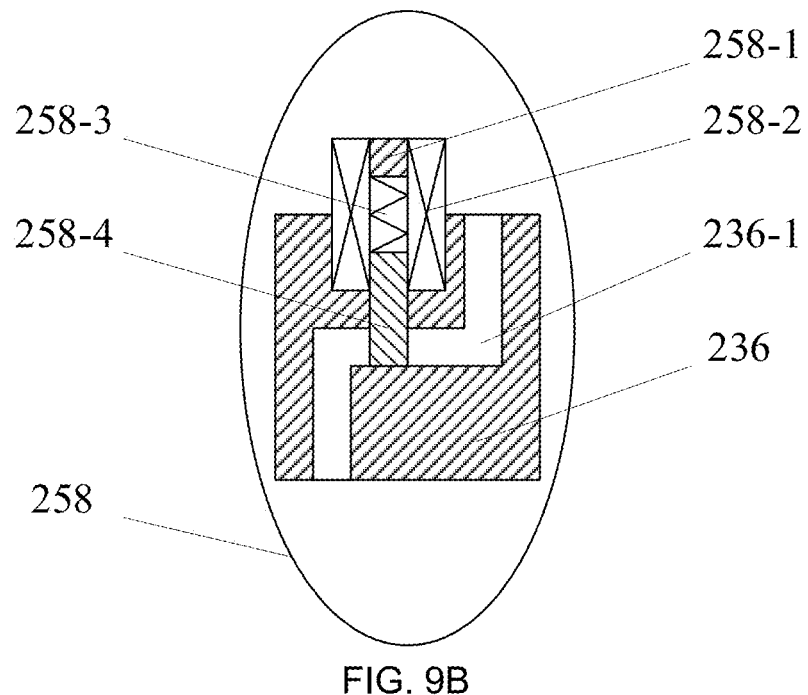
FIG. 9B is a partial enlarged view of section I in FIG. 9A.

FIG. 9A is a structural diagram of a vibration damping actuator 001 provided according to some exemplary embodiments of the present disclosure. FIG. 9B is a partial enlarged view of section I in FIG. 9A. The controllable damping actuator 200 may be connected to the controllable negative stiffness actuator 400 in the vertical direction. The controllable damping component 250 may be an electronically controlled valve vibration damper 250f. The controllable negative stiffness component 450 may be a magnetic mechanism 450a. The first cylinder 410, the first piston rod 430, the second cylinder 210, the second piston 230 and the magnetic mechanism 450a may be the same as those in FIG. 4, and are not repeated here.

As shown in FIG. 9A, the damping fluid may be filled in the upper space 211 of the cylinder body 212. The upper space 211 may be used to install the electronically controlled valve vibration damper 250f. The electronically controlled valve vibration damper 250f may include an electronically controlled valve 258. The electronically controlled valve 258 may be installed on the piston body 236 of the second piston 230. A return path 236-1 may be formed in the piston body 236 for the back and forth flow of the damping fluid on the upper and lower sides of the piston body 236. The electronically controlled valve 258 may be electrically connected to the control system during operation. The control system may control the current passing through the electronically controlled valve 258 based on the control signal, so as to adjust the damping.

As shown in FIG. 9B, the electronically controlled valve 258 may include a fixed iron core 258-1, a third electromagnetic coil 258-2, a coil spring 258-3, and a movable iron core 258-4. The fixed iron core 258-1 and the third electromagnetic coil 258-2 may be installed on the piston body 236. The fixed iron core 258-1 may be connected to the movable iron core 258-4 through the coil spring 258-3. The third electromagnetic coil 258-2 may be electrically connected to the control system during operation. When no current is applied to the third electromagnetic coil 258-2, the movable iron core 258-4 may close the return path 236-1 under the elastic force of the coil spring 258-3. When a current is applied to the third electromagnetic coil 258-2, the movable iron core 258-4 may move upward against the elastic force of the coil spring 258-3 under the action of the electromagnetic force, and may open the return path 236-1. The control system may control the magnitude of the current applied to the third electromagnetic coil 258-2 based on the control signal, so as to control the size of the cross-sectional area of the return path 236-1, and further realize the controllable damping force.

When the second piston 230 vibrates up and down relative to the second cylinder 210 in the vibration direction, the damping fluid may flow back and forth on the upper and lower sides of the piston body 236 through the electronically controlled valve 258. The control system may control the magnitude of the current passing through the third electromagnetic coil 258-2 based on the control signal, so as to control the size of the cross-sectional area of the return path 236-1, and further adjust the damping.

Two magnetic bodies 452-1 may be installed at the top and bottom of the lower space 411 of the cylinder body 212 respectively. The two magnetic bodies 452-1 may both be permanent magnets. A second magnetic device 454 which may move up and down may be arranged between the two magnetic bodies 452-1. The second magnetic device 454 may be an electromagnet. The movement direction of the second magnetic device 454 may be ensured by the sliding connection between the first piston rod 430 and the first guide groove 413 and the sliding connection between the piston rod 231 and the second guide groove 213. The control system may generate the controllable negative stiffness by changing the magnitude of the current applied to the first electromagnetic coil 454-2 in the second magnetic device 454.

It should be noted that in multiple exemplary embodiments of the vibration damping actuator 001 provided by the present disclosure, the different structures of the controllable damping actuator 200 and the controllable negative stiffness actuator 400 may be mutually combined if there is no conflict.

In some exemplary embodiments, the controllable negative stiffness actuator 400 may further realize positive stiffness and adjustment of the positive stiffness based on the control signal during operation. When the controllable negative stiffness actuator 400 is the magnetic mechanism, the control system may change the direction of the current passing through the electromagnet based on the control signal, so as to control the direction of the magnetic field generated by the electromagnet, and further adjust the negative stiffness to the positive stiffness to adjust the positive stiffness, so that the vibration damping actuator 001 may be applied to more scenarios.

The foregoing describes the some exemplary embodiments of the present disclosure. Other exemplary embodiments fall within the scope of the appended claims. In some cases, the actions or steps described in the claims may be performed in sequences different from those in the embodiments and still achieve expected results. In addition, the processes depicted in the accompanying drawings do not necessarily require the specific orders or sequential orders shown for achieving the expected results. In some exemplary embodiments, multitasking and parallel processing are also possible or may be advantageous.

In summary, after reading this detailed disclosure, those skilled in the art may understand that the foregoing detailed disclosure may be presented by way of example only, and may not be limiting. Although there is no clear description, those skilled in the art may understand that the present disclosure intends to cover various reasonable changes, improvements and modifications of the exemplary embodiments. These changes, improvements and modifications are intended to be proposed in the present disclosure and are within the spirit and scope of the exemplary embodiments of the present disclosure.

In addition, some specific terms in the present disclosure have been used to describe the embodiments of the present disclosure. For example, "one embodiment", "an embodiment" and/or "some exemplary embodiments" mean that a specific feature, structure, or characteristic described in combination with the embodiment may be included in at least one embodiment of the present disclosure. Therefore, it may be emphasized and should be understood that two or more references to "an exemplary embodiment" or "one exemplary embodiment" or "an alternative exemplary embodiment" in various parts of the present disclosure do not necessarily all refer to the same exemplary embodiment. In addition, specific feature, structure, or characteristic may be appropriately combined in one or more exemplary embodiments of the present disclosure.

It should be understood that in the foregoing description of the exemplary embodiments of the present disclosure, to help understand a feature, and for the purpose of simplifying the present disclosure, the present disclosure sometimes combines various features in a single exemplary embodiment, a drawing, or description thereof. However, this does not mean that the combination of these features is necessary. It is entirely possible for those skilled in the art to extract some of the features as a single embodiment for understanding when reading the present disclosure. In other words, the exemplary embodiments in the present disclosure may also be understood as an integration of multiple sub-embodiments. The content of each sub-embodiment is also true when it is less than all the characteristics of a single previously disclosed embodiment.

Each patent, patent application, patent application publication and other materials cited herein, such as articles, books, specifications, publications, documents, articles and the like, may be incorporated herein by reference. The entire content used for all purposes, except for any related litigation document history, may be inconsistent or conflicting with this document, or any identical litigation document history that may have restrictive influence on the broadest scope of the claims. Those are associated with this document now or in the future. For example, if the description, definition, and/or use of terms associated with any materials contained is inconsistent with or in conflict with the terms, description, definition, and/or use associated with this document, the terms in this document shall prevail.

Finally, it should be understood that the exemplary embodiments of the application disclosed herein are explanations of the principle of the implementations of the present disclosure. Other modified embodiments are also within the scope of the present disclosure. Therefore, the exemplary embodiments disclosed in the present disclosure are merely examples rather than limitations. Those skilled in the art may adopt alternative configurations according to the exemplary embodiments of the present disclosure to implement the application in the present disclosure. Therefore, the exemplary embodiments of the present disclosure are not limited to those exactly described in the application.

What is claimed is:

1. A vibration damping actuator, comprising:
  a controllable damping actuator adjusting damping based on a control signal of a control system during operation; and
  a controllable negative stiffness actuator, connected to the controllable damping actuator, and adjusting negative stiffness at least based on the control signal during operation, wherein
  the controllable negative stiffness actuator includes a controllable negative stiffness component including a magnetic mechanism, adjusting a magnitude and direction of a magnetic field based on the control signal during operation, so as to form and adjust the negative stiffness in a vibration direction,
  the magnetic mechanism includes:
  a first magnetic device, including a magnetic pole distribution direction parallel to the vibration direction, and
  a second magnetic device, slidably connected to the first magnetic device in the vibration direction, and including a magnetic pole distribution direction the same as that of the first magnetic device, wherein
  the first magnetic device includes two magnetic bodies, fixedly connected and arranged oppositely at intervals in the vibration direction, and including the same magnetic pole distribution direction,
  the second magnetic device is located between the two magnetic bodies, attracts to the two magnetic bodies in the vibration direction, and moves between the two magnetic bodies,
  when the second magnetic device is located at a central position of the two magnetic bodies, the second magnetic device is in an equilibrium position, and a resultant force of the two magnetic bodies on the second magnetic device is zero, and
  when the second magnetic device vibrates away from the equilibrium position relative to the two magnetic bodies in the vibration direction, a direction of the resultant force of the two magnetic bodies on the second magnetic device is the same as the vibration direction of the second magnetic device, so that the magnetic mechanism includes the negative stiffness.

2. The vibration damping actuator according to claim 1, wherein during operation, the vibration damping actuator is connected to a first object and a second object, and when the first object vibrates in a vibration direction relative to the second object:
the controllable damping actuator applies a damping force to the first object and the second object,
the controllable negative stiffness actuator applies an additional force to the first object and the second object, and the damping force and the additional force are in opposite direction, and
the vibration damping actuator adjusts a magnitude of the damping and the negative stiffness based on the control signal, so that a direction of a resultant force of the damping force and the additional force is the same as or opposite to the vibration direction.

3. The vibration damping actuator according to claim 1, wherein the controllable damping actuator includes at least one of: an electric/magnetorheological vibration damper, an electronically controlled valve vibration damper, an energy regenerative vibration damper, an air spring or a semi-active inerter.

4. The vibration damping actuator according to claim 1, wherein the controllable negative stiffness component further includes:
a controllable negative stiffness spring mechanism, including at least one controllable stiffness spring distributed at a preset included angle with the vibration direction, so as to form the negative stiffness in the vibration direction and adjust the negative stiffness based on the control signal during operation.

5. The vibration damping actuator according to claim 4, wherein:
at least one of the first magnetic device or the second magnetic device is an electromagnet, and the electromagnet changes the magnitude and direction of the magnetic field based on the control signal during operation, so as to adjust the negative stiffness.

6. The vibration damping actuator according to claim 5, wherein the first magnetic device includes:
at least one ring-like magnetic body, fixedly connected and arranged oppositely at intervals in the vibration direction, and including the same magnetic pole distribution direction, wherein
the second magnetic device is located in a ring of the at least one ring-like magnetic body, and is coaxial with the ring; the second magnetic device attracts each other with the first magnetic device in a radial direction of the ring;
when a center of the second magnetic device in the vibration direction is the same as a center of the first magnetic device in the vibration direction, the second magnetic device is in an equilibrium position, and a resultant force of the first magnetic device on the second magnetic device is zero; and
when the second magnetic device vibrates away from the equilibrium position relative to the first magnetic device in the vibration direction, a direction of the resultant force of the first magnetic device on the second magnetic device is the same as the vibration direction of the second magnetic device, so that the magnetic mechanism includes the negative stiffness.

7. The vibration damping actuator according to claim 6, wherein the at least one ring-like magnetic body is a permanent magnet, and the second magnetic device is the electromagnet.

8. The vibration damping actuator according to claim 4, wherein the controllable negative stiffness actuator further includes:
a first cylinder; and
a first piston rod, slidably connected to the first cylinder in the vibration direction,
wherein the controllable negative stiffness component is respectively connected to the first cylinder and the first piston rod.

9. The vibration damping actuator according to claim 8, wherein the controllable damping actuator includes:
a second cylinder, accommodating damping fluid;
a second piston, located in the second cylinder, and slidably connected to the second cylinder in the vibration direction, wherein the first cylinder and the first piston rod are respectively connected to the second cylinder and the second piston; and
a controllable damping component, connected to at least one of the second cylinder or the second piston, and adjusting of the damping based on the control signal during operation, wherein when the second piston and the second cylinder vibrate relative to each other, the controllable damping component applies a controllable damping force its direction is opposite to vibration directions of the second cylinder and the second piston to the second cylinder and the second piston.

10. The vibration damping actuator according to claim 9, wherein the damping fluid is magnetorheological fluid, and the controllable damping component includes:
an electromagnetic coil, installed on the second cylinder or the second piston, electrically connected to the control system during operation, and controlling a current passing through the electromagnetic coil based on the control signal,
wherein the controllable damping component controls the current passing through the electromagnetic coil based on the control signal during operation, so as to control an intensity of the magnetic field, change a viscosity and fluidity of the magnetorheological fluid, and further adjust the damping.

11. The vibration damping actuator according to claim 10, wherein the controllable damping component further includes:
an iron core, installed in the electromagnetic coil.

12. The vibration damping actuator according to claim 10, wherein the controllable damping component further includes:
a coil support, including a wire slot, wherein the electromagnetic coil is wound in the wire slot.

13. The vibration damping actuator according to claim 10, wherein the electromagnetic coil is installed on the second piston, and is opposite to the second cylinder in a direction perpendicular to the vibration direction, and a magnetorheological fluid gap exists between the second piston and the second cylinder.

14. The vibration damping actuator according to claim 10, wherein the electromagnetic coil is installed on the second piston, and is opposite to the second cylinder in the vibration direction; and
the controllable damping component further includes a bottom plate installed on the second cylinder and opposite to the electromagnetic coil.

15. The vibration damping actuator according to claim 10, wherein the electromagnetic coil is installed on the second cylinder; and the controllable damping component further includes a bottom plate installed on the second cylinder and opposite to the second piston.

16. The vibration damping actuator according to claim 9, wherein the controllable damping component includes:

an electronically controlled valve, installed on the second piston, and electrically connected to the control system during operation, wherein when the second piston vibrates relative to the second cylinder in the vibration direction, the damping fluid flows back and forth on both sides of the second piston through the electronically controlled valve, and the control system controls a current passing through the electronically controlled valve based on the control signal, so as to adjust the damping.

17. The vibration damping actuator according to claim 1, wherein the two magnetic bodies are both permanent magnets, and the second magnetic device is the electromagnet.

18. The vibration damping actuator according to claim 1, wherein the controllable negative stiffness actuator further provides positive stiffness and adjusts the positive stiffness based on the control signal during operation.

* * * * *